US012731025B2

(12) United States Patent
Flint

(10) Patent No.: US 12,731,025 B2
(45) Date of Patent: Sep. 8, 2026

(54) METHOD AND SYSTEM FOR SECURELY STORING DATA FOR USE WITH ARTIFICIAL NEURAL NETWORKS

(71) Applicant: Alexander Calhoun Flint, Birchgrove (AU)

(72) Inventor: Alexander Calhoun Flint, Birchgrove (AU)

( * ) Notice: Subject to any disclaimer, the term of this patent is extended or adjusted under 35 U.S.C. 154(b) by 940 days.

(21) Appl. No.: 17/965,705

(22) Filed: Oct. 13, 2022

(65) Prior Publication Data

US 2023/0114002 A1 Apr. 13, 2023

Related U.S. Application Data

(63) Continuation-in-part of application No. 17/652,743, filed on Feb. 28, 2022.

(60) Provisional application No. 63/155,210, filed on Mar. 1, 2021.

(51) Int. Cl.
*G06N 3/08* (2023.01)
*G06V 10/82* (2022.01)

(52) U.S. Cl.
CPC ............... *G06N 3/08* (2013.01); *G06V 10/82* (2022.01)

(58) Field of Classification Search
CPC .......... G06N 3/08; G06N 3/0464; G06N 5/01; G06N 7/01; G06N 20/10; G06N 20/20; G06N 3/098
See application file for complete search history.

(56) References Cited

U.S. PATENT DOCUMENTS 12,322,189 B2 * 6/2025 Hüger ................. G06F 18/2414
2018/0293711 A1 * 10/2018 Vogels .................... G06F 17/10
2019/0087689 A1 * 3/2019 Chen ...................... G06V 10/82
2019/0130218 A1 * 5/2019 Albright .............. G06V 10/772
2019/0294956 A1 * 9/2019 Cheung .................. G06N 3/047
2019/0340381 A1 11/2019 Yavuz et al.

(Continued)

OTHER PUBLICATIONS

J. Talukdar, A. Biswas and S. Gupta, "Data Augmentation on Synthetic Images for Transfer Learning using Deep CNNs, " 2018 5th International Conference on Signal Processing and Integrated Networks (SPIN), Noida, India, 2018, pp. 215-219, doi: 10.1109/SPIN.2018.8474209 (Year: 2018).*

(Continued)

*Primary Examiner* — Michael J Huntley
*Assistant Examiner* — Jasmine Thanh Thai
(74) *Attorney, Agent, or Firm* — Dickinson Wright PLLC

(57) ABSTRACT

Systems and methods are disclosed for non-orthogonal encryption of data such that artificial neural networks are trained directly on the encrypted data and testing/inference is performed directly on encrypted data. For use with artificial neural networks, original input tensors are programmatically subjected to a sequence of encryption steps: a method for padding the feature set with randomly chosen sets of values; a method for perturbation of the data by altering elements of the feature set (the values stored in the dimensions of input vectors); a method that applies a fixed index shuffle of the data elements in the feature set or applies a random orthogonal matrix transformation of the data elements; and a method for applying convolutions (filters) and pooling (downsampling) to the fixed shuffled data such that informational structure is preserved.

28 Claims, 10 Drawing Sheets

(56) References Cited

U.S. PATENT DOCUMENTS

2019/0354847 A1* 11/2019 Rasch ....................... G06T 7/11
2020/0044852 A1 2/2020 Streit

OTHER PUBLICATIONS

Tang, Hongxiang, Alessandro Ortis, and Sebastiano Battiato. "The impact of padding on image classification by using pre-trained convolutional neural networks." International conference on image analysis and processing. Cham: Springer International Publishing, 2019 (Year: 2019).*
Aprilpyone, MaungMaung, and Hitoshi Kiya. "Block-wise Image Transformation with Secret Key for Adversarially Robust Defense." arXiv preprint arXiv:2010.00801 (2020) (Year: 2020).*
R. Xu, J. B. D. Joshi and C. Li, "CryptoNN: Training Neural Networks over Encrypted Data," 2019 IEEE 39th International Conference on Distributed Computing Systems (ICDCS), Dallas, TX, USA, 2019, pp. 1199-1209, doi: 10.1109/ICDCS.2019.00121 (Year: 2019).*
O.-A. Kwabena, Z. Qin, T. Zhuang and Z. Qin, "MSCryptoNet: Multi-Scheme Privacy-Preserving Deep Learning in Cloud Computing," in IEEE Access, vol. 7, pp. 29344-29354, 2019, doi: 10.1109/ACCESS.2019.2901219 (Year: 2019).*
Xie, Cihang, et al. "Mitigating adversarial effects through randomization." arXiv preprint arXiv:1711.01991 (2017) (Year: 2017).*
Examination report No. 1 for standard patent application; Australian Application No. 2022228483; Feb. 15, 2024.
International Search Report and Written Opinion of the International Searching Authority for PCT/US 22/70872; Jul. 1, 2022.

* cited by examiner

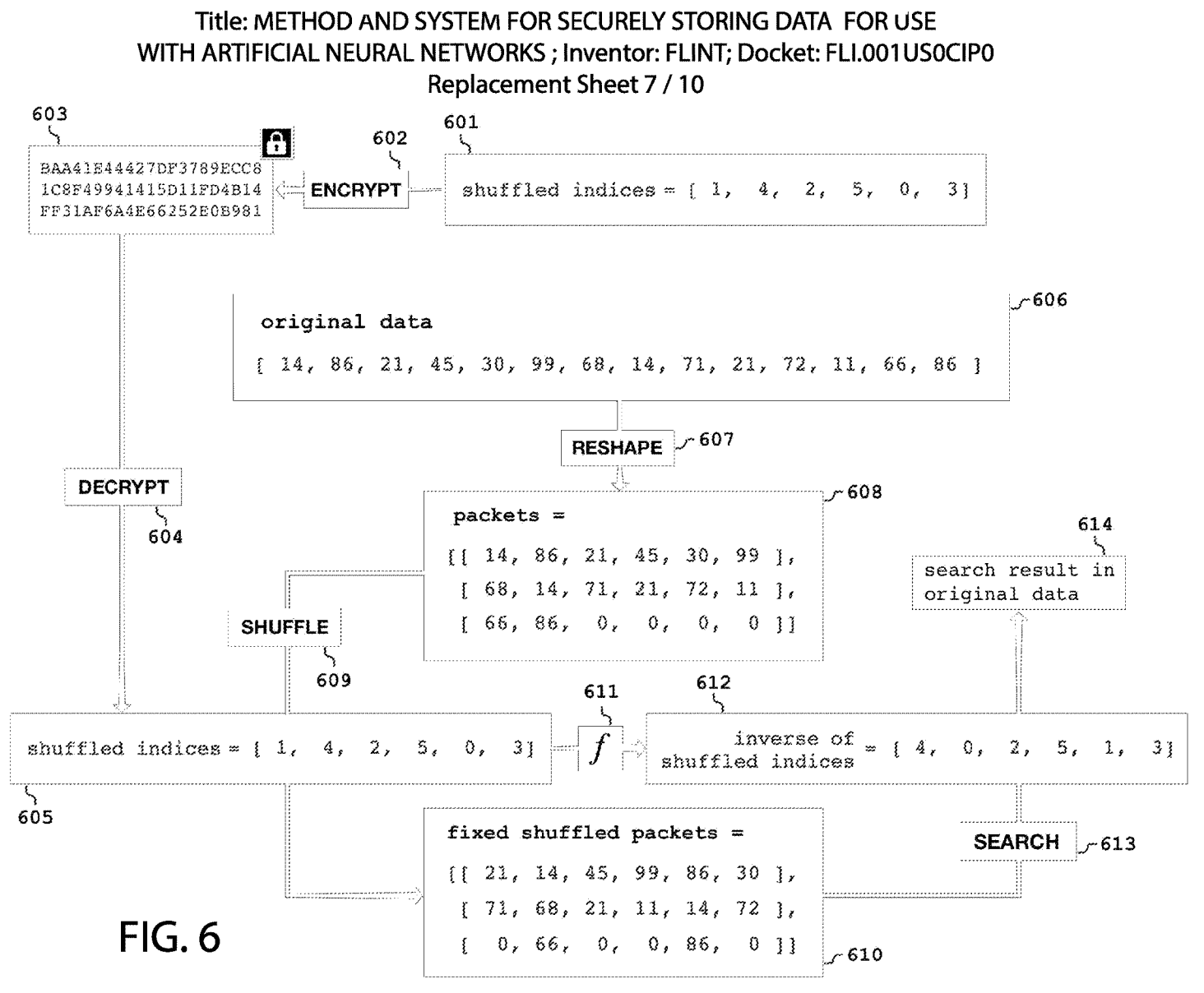

Title: METHOD AND SYSTEM FOR SECURELY STORING DATA FOR USE WITH ARTIFICIAL NEURAL NETWORKS ; Inventor: FLINT; Docket: FLI.001US0CIP0
Replacement Sheet 7 / 10

603
BAA41E44427DF3789ECC8
1C8F49941415D11FD4B14
FF31AF6A4E66252E0B981

602 ENCRYPT 601 shuffled indices = [ 1, 4, 2, 5, 0, 3]

606
original data
[ 14, 86, 21, 45, 30, 99, 68, 14, 71, 21, 72, 11, 66, 86 ]

RESHAPE 607

DECRYPT 604

608
packets =
[[ 14, 86, 21, 45, 30, 99 ],
[ 68, 14, 71, 21, 72, 11 ],
[ 66, 86, 0, 0, 0, 0 ]]

SHUFFLE 609

614 search result in original data 605 shuffled indices = [ 1, 4, 2, 5, 0, 3]

611 $f$ 612 inverse of shuffled indices = [ 4, 0, 2, 5, 1, 3]

fixed shuffled packets =
[[ 21, 14, 45, 99, 86, 30 ],
[ 71, 68, 21, 11, 14, 72 ],
[ 0, 66, 0, 0, 86, 0 ]]
610

SEARCH 613

FIG. 6

METHOD AND SYSTEM FOR SECURELY STORING DATA FOR USE WITH ARTIFICIAL NEURAL NETWORKS

CROSS-REFERENCE TO RELATED APPLICATIONS

This application is a Continuation-In-Part of U.S. application Ser. No. 17/652,743, filed Feb. 28, 2022, which claims the benefit of U.S. Provisional Application No. 63/155,210, filed Mar. 1, 2021, the contents of which is hereby incorporated by reference in its entirety.

BACKGROUND OF THE INVENTION

Field of the Invention

The following relates to data security in the fields of artificial neural networks and algorithmic search, and more specifically to a method and system for securely storing data for use with artificial neural networks.

DISCUSSION OF THE BACKGROUND

Artificial neural networks have a set of inputs, a number of 'hidden' layers of units, and a set of outputs, where the layers are interconnected with adjustable-weight connections. Training an artificial neural network is an iterative process that determines the weights of each connection by presenting the neural network with a large training set of input vectors with known outputs in order to mathematically optimize the set of adjustable weights between units. After the network learns a set of weight adjustments based on the training dataset, a separate validation dataset is then tested to determine the accuracy of the trained network in determining outputs from presented input vectors. When the network is trained to an appropriate level of accuracy, the trained network may then be used to determine outputs in automated fashion from test input vectors for which outputs are not yet known.

FIG. 1A illustrates a prior art method (10) for using an artificial neural network (ANN) using a dataset (101). As is known in the field, ANN (105) may be trained to determine the node weights of the ANN by comparing known inputs from dataset (101) with example labels to generate predictions (109) of the ANN. In general, dataset (101) consists of a plurality of elements, which may be, for example and without limitation, a digital image. Once ANN (105) is trained, the ANN may be used, as illustrated in FIG. 1A, to make predictions of elements which may or may not be part of dataset (101).

Thus, for example and without limitation, FIG. 1A shows an exemplary image (1011) of dataset (101) as being a digital image of a handwritten number 3. Using method (10), as known in the prior art, dataset (101) is provided to trained network (105), which generates a set of corresponding predictions (109), with one prediction for each image of dataset (101). FIG. 1 shows, for example, that neural network (105) accepts image (1011), which is an image of a handwritten number 3, and generates a prediction (1091), which is the numeral "3."

Addition of convolutional and pooling layers to the neural network can improve accuracy and efficiency in tasks such as image interpretation (determining outputs based on input vectors that represent images or video data). Convolutional layers apply a set of image transformations (such as sharpening or edge enhancement) based on the relationships between neighboring pixels, and pooling layers reduce the size of the convolved image vectors, downsampling neighboring pixels by taking the maximum, average, or other derived value from a neighboring group of pixels.

While there is an evolving set of neural network techniques and substantial cloud computing resources available to train networks on new data, data sources that would be suitable for such training are often proprietary or sensitive in nature. Organizations that possess such proprietary or sensitive datasets may not have the necessary technical expertise or local computing resources to train neural networks. Training modern artificial neural networks with large datasets typically relies on cloud computing resources, because such tasks would be computationally intractable using on-premises computing resources. Organizations with proprietary or sensitive datasets may be reluctant to share their data to cloud repositories for the purpose of training artificial neural networks. Transmission of sensitive data to cloud computing resources in an unencrypted form presents a security risk that is impossible to mitigate. Additionally, once an artificial neural network is trained using proprietary data, that network can be used on test data from any source. This leads to a devaluing of proprietary training data that may have been difficult or expensive for an organization to accumulate. These tensions have slowed development of artificial neural networks trained on proprietary or sensitive data.

One proposed solution to some of these problems of data security in training artificial neural networks is known as 'federated learning.' Federated learning involves a central cloud server that is connected to a number of software nodes that can run behind the security firewalls of various organizations or on individual devices. An aggregate model is sent from the server to the nodes, and the nodes perform training on data locally. The resultant local adjustments to model weights are then sent back to the central server, where these weights are averaged with the results of other local training sessions. While federating learning has advantages in areas such as mobile privacy, where lightweight training can occur on a device using a local mobile user's data, with only weight updates sent back to the central server, it fails to solve several of the core issues of concern for organizations with proprietary or sensitive data. In the framework of federated learning, node software from an external source must be deployed behind the organization's firewall, which is a security risk and involves unverifiable trust steps (for example, the organization must trust that the externally-sourced node software will not send any training data to the central server during communication). The distributed nature of federated learning, while a strength in some applications, is also a weakness in the specific application of machine learning to proprietary data sources. The devaluing of an organization's proprietary data remains an intrinsic flaw of artificial neural networks trained using federated learning.

Another proposed solution to problems of data security in training artificial neural networks is application of an orthogonal matrix transformation to input vectors to obtain encoded training and test vectors. Application of an orthogonal matrix transformation maintains vector length and angles between vectors and thus machine learning accuracy is not decremented by this approach. However, the orthogonal matrix transformation approach suffers from an important security liability. Orthogonal matrix transformations are a subset of square matrix linear transformations, and any unknown square matrix linear transformation of shape (n×n) may be explicitly determined given n vectors of length n before transformation and n corresponding vectors of length n after transformation, using standard linear algebraic manipulation known in the art.

Thus, there is a need in the art for a method and apparatus that allows for the training and for the use of neural networks that enables owners of the data used for training the neural network to retain the privacy and value of their data. Such a method and apparatus should be easy to implement, secure, and be computationally efficient.

BRIEF SUMMARY OF THE INVENTION

The present invention overcomes the disadvantages of prior art by modifying the training examples and test example using nonorthogonal transformations.

The present invention overcomes other disadvantages of prior art by modifying the training examples and test example transformations, where not every transformation is the same as every other transformation. Thus, for example and without limitation, one transformation may be different from each of the other identical transformations, or each transformation may be different from each of the other transformations.

The present invention overcomes other disadvantages of prior art by modifying the training examples and test example in a manner that is not the same for each example, Thus for example and without limitation, each example may be modified using a different transformation, or at another extreme, each example may be modified using transformations where at least one of the transformations differs from each of the other transformations.

It is one aspect to provide a method for using modified data with a neural network. The method includes determining a plurality of transformations to modify a plurality of examples, training the neural network using the transformations, and forming predictions using the trained neural network. Determining the plurality of transformations to modify the plurality of examples determines transformations where each example of the plurality of examples includes an array of values, where each example is a training example or a test example, where each transformation of the plurality of transformations is a nonorthogonal transformation, and where each example is modified by a corresponding transformation. Training the neural network is accomplished by: obtaining a plurality of training examples, modifying each training example of said plurality of training examples according to said corresponding transformation to form a plurality of modified training examples, and forming a trained neural network by training a neural network with said plurality of modified training examples. Forming predictions using the trained neural network is accomplished by: accepting a test example, modifying the test example according to said corresponding transformation to form a modified test example, and forming a prediction from the output of the trained neural network by providing said trained neural network with the modified test example as input. In alternative embodiments, at least one transformation of the plurality of transformations differs from each of the other transformations of the plurality of transformations.

Another aspect is to provide that each transformation of the plurality of transformations is the combination of one or more orthogonal transformations and one or more nonorthogonal transformations, and where the one or more orthogonal transformations are the same for each of the plurality of transformations.

Yet another aspect is to provide at least one nonorthogonal transformation of said one or more nonorthogonal transformations includes a plurality of pads of values, where said modifying each training example includes increasing the size of each training example by appending the corresponding pad of values to each training example, and where said modifying the test example includes increasing the size of the test example by appending the corresponding pad of values to the test example.

In various aspects, each pad of values of the plurality of pads of values are the same, where at least two of the pads of values of the plurality of pads of values differ from each other, or where each pad of values of the plurality of pads of values differs from each of the other pads of values of the plurality of pads of values.

One aspect is to provide that at least one nonorthogonal transformation of said one or more nonorthogonal transformations includes a plurality of perturbation functions, where each perturbation function of the plurality of perturbation functions corresponds to a position in the array of each training example and to a position in the array of the test example, where said modifying each training example includes the mathematical equivalent of applying said corresponding plurality of perturbation functions to the values in the corresponding position in the training example, and where said modifying the test example is the mathematical equivalent of applying said corresponding plurality of perturbation functions to the values in the corresponding position in the test example.

In certain aspects, each perturbation function of the plurality of perturbation functions are the same, at least two perturbation functions of the plurality of perturbation functions differ from each other, or where each perturbation function of the plurality of perturbation functions differs from each of the other perturbation functions of the plurality of perturbation functions.

In yet other aspects, at least one orthogonal transformation of said one or more orthogonal transformations is an index shuffling or where at least one orthogonal transformation of said one or more orthogonal transformations is selected from a plurality of random orthogonal matrix transformations.

In other aspects, said one or more nonorthogonal transformations includes two or more nonorthogonal transformations, and where said two or more nonorthogonal transformations includes two or more of: a) a plurality of pads of values, where said modifying each training example includes increasing the size of each training example by appending the corresponding pad of values to each training example, and where said modifying the test example includes increasing the size of the test example by appending the corresponding pad of values to the test example; and b) a plurality of perturbation functions, where each perturbation function of the plurality of perturbation functions corresponds to a position in the array of each training example and to a position in the array of the test example, where said modifying each training example includes the mathematical equivalent of applying said corresponding plurality of perturbation functions to the values in the corresponding position in the training example, and where said modifying the test example is the mathematical equivalent of applying said corresponding plurality of perturbation functions to the values in the corresponding position in the test example.

In yet other aspects, training the neural network is performed by two or more parties, and/or said forming predictions using the trained neural network is performed by two or more parties.

Another aspect includes maintaining a ledger of the occurrence of said modifying a test example or of the occurrence of said providing said trained neural network with a modified test example to form a prediction.

Yet other aspects further include prior to forming predictions using the trained neural network, encrypting said plurality of transformations to form a plurality of encrypted transformations, and where said forming predictions using the trained neural network further includes accepting said plurality of encrypted transformations and decrypting said plurality of encrypted transformations.

One aspect is to provide a system for using modified data with a neural network, said system including networked memory and processors programmed to: form a plurality of transformations to modify a plurality of examples, train the neural network, and form predictions using the trained neural network. The plurality of transformations are used to modify a plurality of examples, where each example of the plurality of examples includes an array of values, where each example is a training example or a test example, where each transformation of the plurality of transformations is a nonorthogonal transformation, and where each example is modified by a corresponding transformation. The programming to train the neural network includes programming to: obtain a plurality of training examples, modify each training example of said plurality of training examples according to said corresponding transformation to form a plurality of modified training examples, and form a trained neural network by training a neural network with said plurality of modified training examples. The programming to form predictions using the trained neural network includes programming to: accept a test example, modify the test example according to said corresponding transformation to form a modified test example, and form a prediction from the output of the trained neural network by providing said trained neural network with the modified test example as input. In alternative embodiments, at least one transformation of the plurality of transformations differs from each of the other transformations of the plurality of transformations.

Other certain aspects are noted above, where the processors are programmed to execute the method steps described therein.

These features together with the various ancillary provisions and features which will become apparent to those skilled in the art from the following detailed description, are attained by the method and system of the present invention, preferred embodiments thereof being shown with reference to the accompanying drawings, by way of example only, wherein:

BRIEF DESCRIPTION OF THE SEVERAL VIEWS OF THE DRAWING

FIG. 6 illustrates methods to prepare data for storage and transmission in fixed shuffled packets for use with programmatic search;

Reference symbols are used in the figures to indicate certain components, aspects or features shown therein, with reference symbols common to more than one figure indicating like components, aspects or features shown therein.

DETAILED DESCRIPTION OF THE INVENTION

Figure 1A:
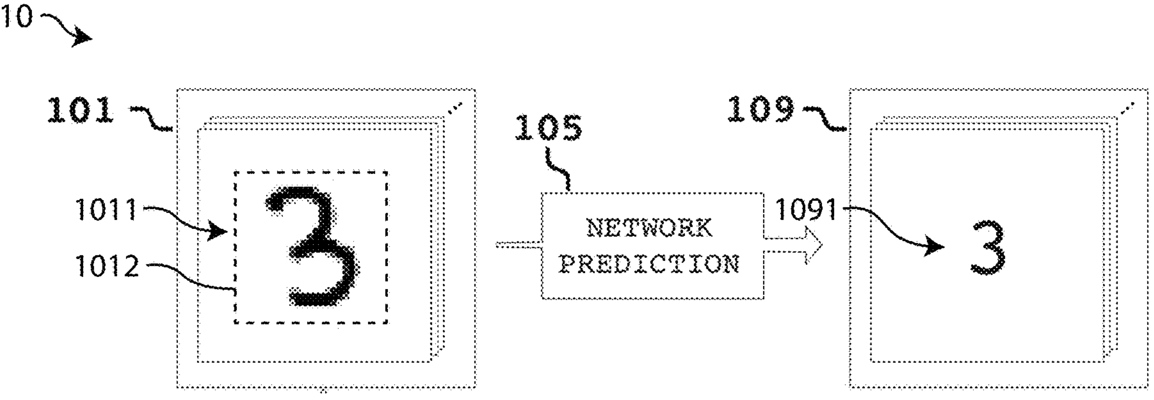
FIG. 1A illustrates a prior art method for predicting using artificial neural networks.
Figure 1B:
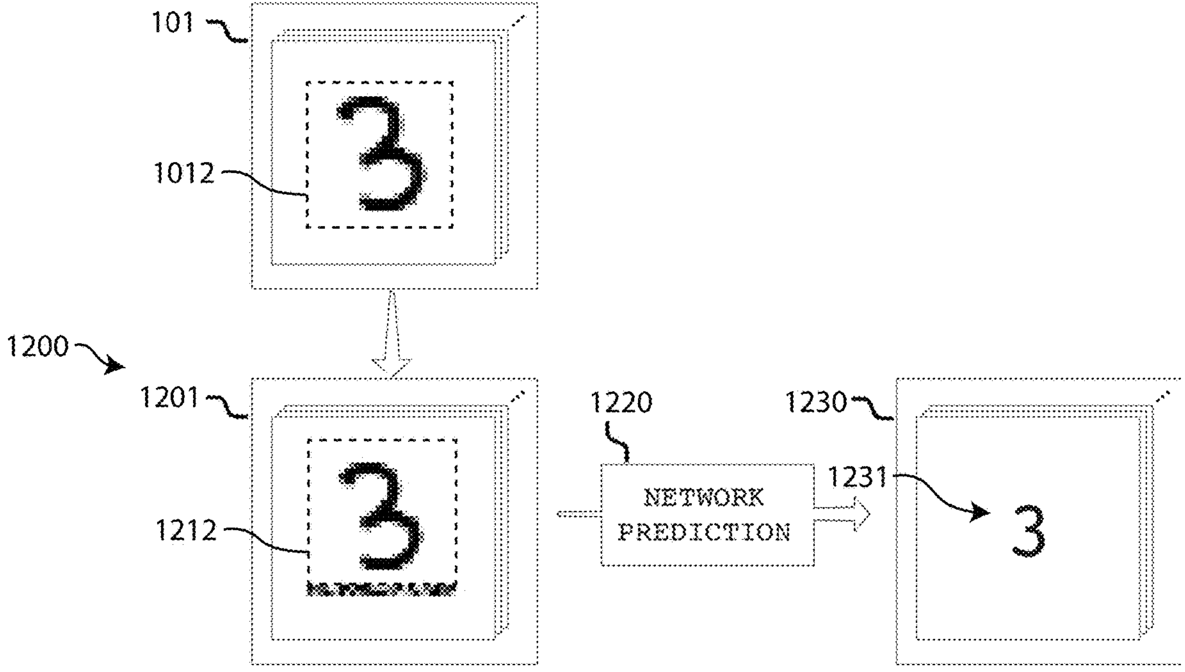
FIG. 1B illustrates an inventive method for predicting using artificial neural networks.

FIG. 1B illustrates inventive method (1200) for predicting using artificial neural networks from a dataset, where each item of the dataset is an element or vector, and is referred to herein as a training example. Method (1200) differs from prior art method (10) in that each training example of dataset (101) is first modified, as described subsequently, to form a modified dataset (1201) which may be used to train an ANN (1220). Further, method (1200) may be used to form predictions from one or more test examples by first modifying the test examples in a manner similar to the modifications of the training examples and then submitting the modified training examples to ANN (122) to form predictions (1230).

In general, method (1200) modifies both dataset (101) (the training examples) and test examples according to one or more transformation or algorithms to form modified training examples and modified test examples, where there is a one-to-one correspondence between the examples and the modified examples. The terms "transformation," and "algorithm" are used interchangeably herein. Thus, for example and without limitation, numerical values of each image of dataset (101) are modified to obtain values which form a corresponding image of dataset (1201). The modifications are described herein as being performed according to an algorithm, which may be a single algorithm, two or more sequential algorithms, or a mathematical equivalent thereof. Thus, for example and without limitation and as described subsequently, the algorithm may be any combination of nonorthogonal transformations, such as a padding or a perturbation, with an orthogonal transformation which may be, for example and without limitation, a fixed shuffle or other random orthogonal matrix transformation.

With ANN (1220) having been trained using modified dataset (1201), predictions may then be made by submitting a modified test examples to the ANN. Thus, for example, one or more test examples are modified in a manner similar to the modification of dataset (1201), and then presented to the ANN for predictions.

In various embodiments, the transformation applied to each of the training examples and test examples (the "examples") are the same—that is, each example is subject to the same, or "fixed," transformation. In various other embodiments, not every transformation is the same, and there is more than one transformations applied to the examples, referred to herein as "non-fixed transformations." Non-fixed transformations include a range of each transformation being different from every other transformation to at least two of the transformation being different from each other, as described subsequently. The use of the term "transformation" without reference to it being fixed or non-fixed is meant herein to denote that the transformation may be fixed or non-fixed, unless explicitly stated.

Further, as noted above, each transformation may be a sequential application of two or more algorithms or transformations. In general, each transformation or component transformation may be either fixed or non-fixed.

Thus, in various embodiments: 1) each example is modified by the same transformation (a "fixed" transformation); or 2) two or more examples are modified by a different transformation—that is, there are more than one transformation, referred to as a "non-fixed" transformation. There may be two different non-fixed transformations, or there may be as many non-fixed transformations as there are examples.

Further, in certain embodiments, the transformation applied to each example is a non-orthogonal transformations, that is, they are nonlinear and do not preserve inner products, where the non-orthogonal transformation(s) may be either a fixed or non-fixed non-orthogonal transformation. In yet other embodiments, the non-orthogonal transformation applied to each example is the combination of a fixed or non-fixed non-orthogonal transformation and a fixed orthogonal transformation.

In general, each dataset item of the training set as an element, or without limitation, as an image. For illustrative purposes, the following discussion describes dataset elements that are images each having the same number of horizontal and vertical pixels, and with each pixel having the same number of bits of depth. In general, and without limitation, the dataset elements are tensors of order 2 or more, and are referred to without limitation, as data, arrays, or tensors.

For illustrative purposes, dataset (101) is shown in FIG. 1 as the standard dataset known as "MNIST" (http://yann.lecun.com/exdb/mnist/), where each image in the dataset is a digitized image of a handwritten digit. By way of example, each image of dataset (101) has a dimension of 28 by 28 (x by y) pixels, where the outline is indicated by dashed line (1012) that is not part of the dataset, and each pixel has a grayscale value with 8-bit depth.

After modified dataset (1201) is obtained, ANN (1220) is trained on the modified dataset. ANN (1220) may be used to generate predictions (1231) from the modified dataset (1201). The following discussion inventively uses these methods, as well as various methods of using neural networks on modified or encrypted datasets.

Figure 1C:
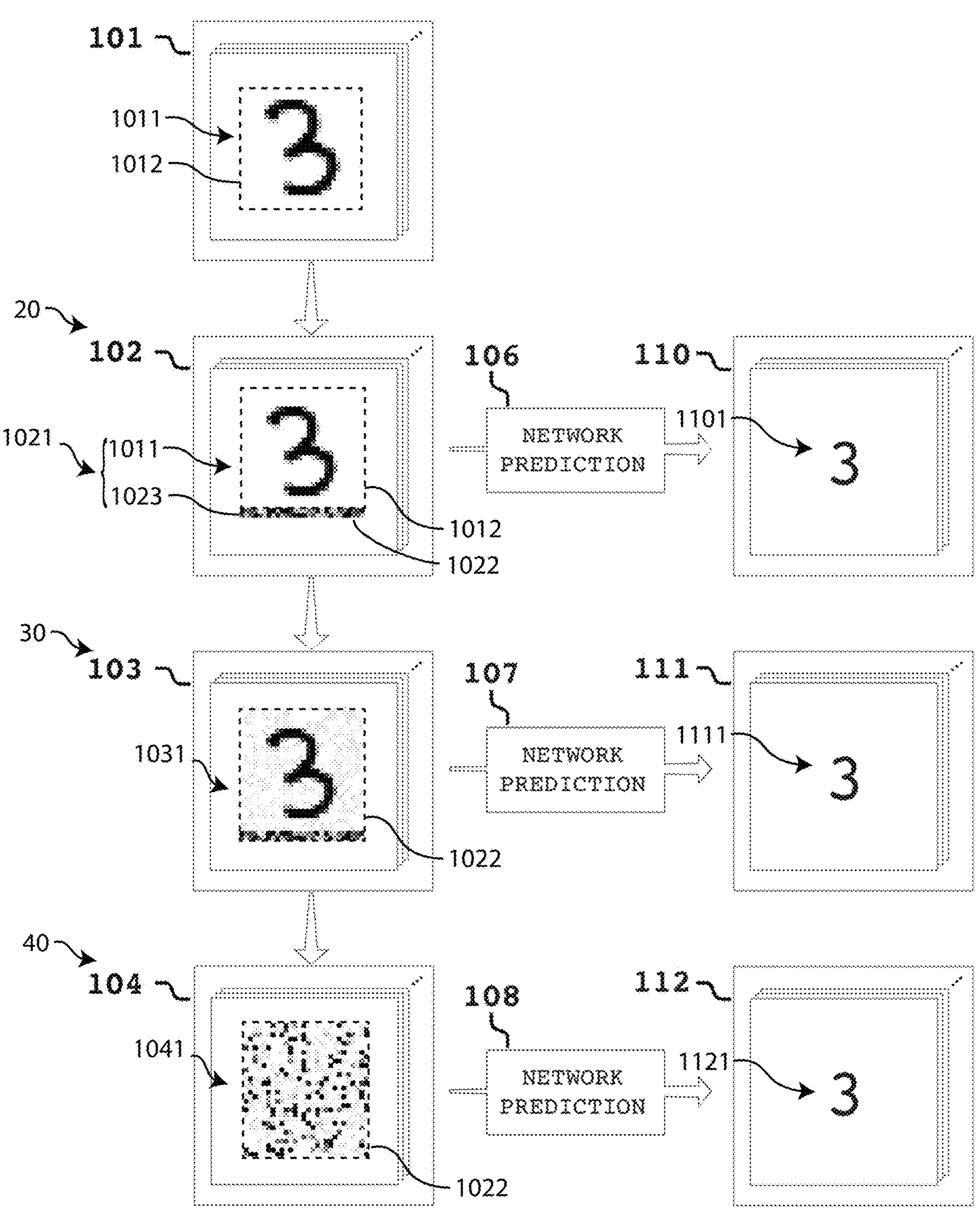
FIG. 1C illustrates three embodiments for predicting using artificial neural networks.

Three embodiments of method (1200) are illustrated in FIG. 1C. A first embodiment of method (1200) is method (20), wherein dataset (101) is modified to obtain a modified dataset (102), which is used to train ANN (106), which may be used to produce a set of predictions (110). Individual images of modified dataset (102) are modified images of dataset (101), where the modification adds a "padding" to the images of dataset (101). The padding, for purposes of illustration, without restriction, is shown here as a randomly generated block of pixels having a rectangular shape with one dimension corresponding to a dimension of images in dataset (101).

An exemplary image (1021) of modified dataset (102) includes image (1011) having an outline (1012), and the padding (1023) of size 28 by 2 (x by y) with 8-bit depth that is positioned below image (1011). Each image of modified dataset (102) thus includes a different image from dataset (101) that is combined with a 28×2 pixel padding provided below the image of dataset (101). In one embodiment, the padding of each image of modified dataset (102) is the same for each image (thus referred to henceforth and without limitation as having a "fixed padding" or as having the "application of a fixed padding"), and in other embodiments, the padding of each image of modified dataset (102) is different for different images (thus referred to henceforth and without limitation as having a "non-fixed padding" or as having the "application of a non-fixed padding." Collectively, the embodiments of fixed padding and non-fixed padding will be referred to henceforth and without limitation as "padding" or "application of a padding." In one embodiment of fixed padding, the same pad is applied to each example across the training and test example. In one embodiment of non-fixed padding, a different random pad is generated and applied to each example across the training and test tensors. In yet another embodiment of non-fixed padding, a set of pads that is smaller than the number of examples is generated, and then random choice from this more limited set of pads is used to append pads to the various examples. In another embodiment of non-fixed padding, a first pad is generated of appropriate shape and stored in memory. This stored pad in memory is then adjusted pixel by pixel by a random amount in a specified range (by the same computational process as that applied in the non-fixed perturbation transformation discussed in detail below), and differently adjusted pads are then applied to each example across the training and test tensors. When non-fixed padding is used during training, test or inference examples are, in some embodiments, treated the same way (a pad is applied that is different for each example, according to the parameters used for the training examples), or, in other embodiments, an average of the non-fixed pads is used during testing or inference. The embodiment of method (1200) may be used to pad an original dataset (101) as illustrated or may be used to pad a dataset that has been subjected to an arbitrary number of prior transformations of padding, perturbation, or orthogonal transformation as described herein. It will be apparent to those skilled in the art that the various embodiments of padding transformation are non-orthogonal transformations, wherein input vectors transformed to output vectors do not maintain unchanged vector lengths from input to output and do not maintain unchanged angles between vectors from input to output.

Using method (20), artificial neural network (106) is trained using the padded modified dataset (102), providing the resulting set of predictions (110). The accuracy of the predictions obtained using method (20) by adding padding to dataset (101) does not differ substantively from that obtained from method (10) because the padding data do not associate with training labels used for supervised learning (or with feature aspects of interest in the case of unsupervised learning), and thus the padding data only have minor contributions to the adjustments of network weights during training and do not contribute substantively to the prediction (110) of the trained network. Thus, for example, neural network (106) accepts image (1021), which is a modified image of a handwritten number 3 composed of the original image of the handwritten number 3 (1011) with the randomly generated padding data (1023) appended, and generates a prediction (1101), which is the numeral "3," where prediction (1101) is the same as prediction (1091). Within the scope of the present invention, an arbitrary size and shape of padding data may be used, and the position of the padding data may be in any chosen relation to the shape of the dataset to be padded, such that any number of blocks of padding data may be appended to the parent dataset, external to, or within, the dimensions of the parent dataset. The choice of padding data is not limited to sizes and shapes of padding data that retain the original tensor rank of the parent dataset, and padding data may be chosen such that appending the padding data raises the rank of the modified tensor above that of the parent dataset—for example, a parent dataset tensor of rank 3 could be converted to a tensor of rank 4 or higher by appending padding data of the appropriate shape. In additional embodiments, the shape of the original tensor may be cropped prior to appending the padding data such that the shape of the resulting padded tensor is not different from the original tensor shape before the application of cropping and appending of the padding. In additional embodiments, the size of the original tensor before padding is larger than is needed for machine learning training (e.g., original examples have a border of invariant values), so application of cropping followed by padding retains the original tensor shape but does not remove any useful training information from the original dataset. The choice of padding may be determined by generation of a random block of data of arbitrary size and shape, as illustrated in (102), or the statistical distribution of randomly generated values may be constrained by a priori considerations such as the statistical distribution of values in the parent dataset. The bit depth of the appended padding may be chosen to match the bit depth of the parent dataset's values, or the bit depth of the parent dataset may be increased or decreased to match the bit depth of the values of an appended pad.

A second embodiment of method (1200) is method (30), wherein dataset (101) is first modified to obtain a modified dataset (102), which is further modified to obtain modified dataset (103), which is used to train ANN (107), which may be used to produce a set of predictions (111). Modified dataset (103) is obtained by: first applying padding modifications to dataset (101) as described above to obtain modified dataset (102), followed by further modifying the modified dataset (102) by perturbation modifications to obtain modified dataset (103). Individual images of dataset (103) are modified images of modified dataset (102), with each pixel of each image of modified dataset (102) being subjected to a transformation that perturbs the pixel value. The second embodiment of method (1200) may be used to perturb the pixel values of a padding modified dataset (102) as illustrated or may be used to perturb the pixel values of an original dataset (101) or a dataset that has been subjected to an arbitrary number of prior transformations of padding, perturbation, or orthogonal transformation as described herein. It will be apparent to those skilled in the art that the various embodiments of perturbation transformation are non-orthogonal transformations, wherein input vectors transformed to output vectors do not maintain unchanged vector lengths from input to output and do not maintain unchanged angles between vectors from input to output.

In one embodiment, the modification of modified dataset (102) to modified dataset (103) includes a transformation of applying a mathematically defined "perturbation function" to each pixel of every image. There are thus as many perturbation functions as there are pixels in an image, and the perturbation functions may be stored in a "perturbation array" which as the same size as each image. The transformation may occur, for each image, by applying the perturbation function in each of the perturbation array locations to the value of the corresponding pixel. In one embodiment, the perturbation transformation is a fixed perturbation, in which the same perturbation array of perturbation functions is applied to each of the examples, and in other embodiments, the perturbation transformation is a non-fixed perturbation, in which different sets of perturbation functions are applied to the different examples across the training and test tensors. In the illustrative example (30), each pixel is perturbed by a small, randomly determined, amount. By way of example, image (1031) of dataset (103) has the size of image (1021).

In an illustrative example, each image of dataset (103) takes an image of modified dataset (102) and adjusts each pixel by a randomly chosen amount, increasing or decreasing the value of each parent pixel from modified dataset (102) by a random amount varying, in the presented example, between a maximum range of a decrease of 5% to an increase of 5%, thus yielding a fine amount of light gray pixel random perturbations as shown in image (1031)—in practice, a smaller or larger range of perturbations may be chosen. In the illustrative example, the array of perturbation functions is applied by storing the randomly-chosen adjustment percentage values in a data array corresponding to the shape of the images of the parent modified dataset (102), in this example 30 by 28 pixels, and this stored perturbation array is applied by increasing or decreasing the value of the corresponding pixels in the example image. In one embodiment, application of the array of perturbation functions to each pixel of the image is applied as fixed perturbation, applying the array of perturbation functions in identical fashion to every example of the parent modified dataset (102), yielding the resulting dataset (103). In another embodiment, a non-fixed perturbation transformation is applied in which a different array of perturbation functions is applied to each example across the training and test tensors. In the embodiment wherein the perturbation array is fixed for every element of the dataset, the perturbation process will be referred to henceforth and without limitation as "fixed perturbation" or "application of a fixed perturbation", and in the embodiment wherein the perturbation array is different for each element of the dataset, the perturbation process will be referred to henceforth and without limitation as "non-fixed perturbation" or "application of a non-fixed perturbation." Collectively, the embodiments of fixed perturbation and non-fixed perturbation will be referred to henceforth and without limitation as "perturbation" or "application of a perturbation". In one embodiment of non-fixed perturbation, a different set of pixel variation functions are randomly generated for each example with an a priori minimum to maximum range for the degree of possible perturbation (e.g., min=−5% to max=+5% perturbation of pixel values). In another embodiment of non-fixed perturbation, a different set of functions are applied to each example with additional random variation from example to example of the minimum to maximum range of possible pixel variation, within a priori specified bounds for this random variation. The choice of perturbation functions stored in the perturbation array and applied to the elements in the parent modified dataset (102) may be a randomly chosen adjustment value between a fixed or adjustable negative percentage of the original value and a fixed or adjustable positive percentage of the original value, as illustrated, or it may be, without restriction, any array of linear or nonlinear mathematical perturbation functions acting on the original values. Values transformed by perturbation that would exceed the bounds of the range of values in use (for example, the bit depth of values in use) are, in preferred embodiments, transformed by means established in the digital signal processing art such as constraint to maximum or minimum values ('clipping'), reflection to values within the established range, wrapping around from one end to the range to the other, or other established digital signal processing methods including, but not limited to, compression or limiting. The choice of positive or negative range limitations to any randomly chosen perturbation values or the choice of mathematical transformation may be adjusted according to considerations such as the statistical distribution of values in the parent dataset.

Method (30), with up to −/+5% perturbation in this example, yields predictions (111) that do not differ substantively in accuracy from those of methods (10) or (20). Thus, for example, neural network (107) accepts image (1031), which is a modified image of a handwritten number 3, and generates a prediction (1111), which is the numeral "3," where prediction (1111) is the same as prediction (1091) and (1101).

In other embodiments, the bit depth or data type of the source data is transformed prior to the perturbation process. For example, a dataset with 8-bit depth may be transformed to a corresponding dataset with 16-bit depth, or any other choice of bit depth higher or lower than the starting value, by standard means known in the art, or by conversion of one data type to another data type (e.g., conversion of integer data to floating-point data). Such bit-depth or data type transformation permits finer gradation adjustments of the data by the perturbation process described herein and further prevents determination of the aggregate non-orthogonal combination of transformations described below by decoupling the bit depth or data type of the source dataset and that of the transformed dataset.

A third embodiment of method (1200) is method (40), wherein dataset (101) is first modified to obtain a modified dataset (102), which is further modified to obtain modified dataset (103), and which is further modified to obtain modified dataset (104), which is used to train ANN (108), which may be used to produce a set of predictions (112). Modified dataset (104) is obtained by: first applying fixed or non-fixed padding modifications to dataset (101) as described above to obtain modified dataset (102), followed by further modifying the modified dataset (102) by fixed or non-fixed perturbation modifications to obtain modified dataset (103), followed by applying a shuffling or the selection of a random orthogonal matrix transformation modification to the modified dataset (104). An example of method (40) illustrates the use of a dataset (104) for training and prediction from an ANN (108) to produce a set of predictions (112).

Individual images of dataset (104) are images of dataset (103) that are modified by a mathematical transformation in which the data in each image in dataset (103) is subjected to a random orthogonal matrix transformation, one subset of which is a "fixed shuffling," which is shown for illustrative purposes. Alternatively, as discussed subsequently, the examples are modified by non-fixed shuffling. Shuffling rearranges the data in each image of dataset (103) by reordering the position of the pixels and storing the shuffled pixels in a corresponding image of dataset (104), a transformation that is a random index shuffling, a specific case of random orthogonal matrix transformation. The shuffling of the pixels is randomly determined, but with fixed shuffling each image of dataset (103) is shuffled according to the same movements of pixel position to form the corresponding image of dataset (104). Information on how to shuffle the pixels of each image of example in a dataset containing a plurality of images or examples is stored as a set of "shuffled indices," or as an orthogonal matrix encoding the index shuffling. This shuffling process is referred to henceforth and without limitation as a "fixed shuffling," an "index shuffling", or an "application of a fixed shuffle" to the dataset, yielding a fixed shuffled dataset (104), unless explicitly noted as being non-fixed shuffling.

A randomly chosen shuffling transformation herein described and illustrated in the Figures is a subset of the broader set of random orthogonal matrix transformations for an array of input vectors of a given dimension. For a given input vector of n dimensions (e.g., an image example with a total of n pixels), a random orthogonal matrix may be determined with shape n columns by n rows such that the random orthogonal matrix transformation of input vectors by matrix·vector multiplication to yield output vectors maintains vector lengths and angles between vectors. In some embodiments, a random orthogonal matrix of shape (n, n) with floating point values is determined by random choice from the set of orthogonal matrices known in the art as the uniform O(N) Haar distribution of orthogonal matrices and stored in computer memory to perform matrix·vector multiplication on input vectors to yield transformed output vectors. In other embodiments, a random square matrix of floating-point values with shape (n, n) is first determined and then the operation known in the art as QR factorization is used to obtain from the random square matrix of floating-point values an upper triangular square matrix of shape (n, n) and a random orthogonal matrix of shape (n, n). The random orthogonal matrix thus obtained is stored in computer memory to perform matrix·vector multiplication on input vectors to yield transformed output vectors. In certain embodiments, the random orthogonal matrix transformation or fixed shuffle transformation is combined with one or more non-orthogonal transformations of padding and/or perturbation to yield an aggregate non-orthogonal transformation.

In other embodiments, a non-fixed shuffling transformation (application of a different random shuffling to each example in the training, test, and inference datasets) is used, with separate example-wise shuffling disrupting the spatial relationships of the data elements across examples, thus requiring a machine learning system to train on non-spatial data alone. Those skilled in the art will recognize that this effect of removing available spatial information from the training data will be undesirable in many applications, but this effect does allow for a quantitative assessment of what aspects of a given dataset (spatial vs non-spatial) are important to network training, because training on a fixed shuffled dataset allows models to train on spatial information (e.g., the arrangement of pixels in a dataset) as well as non-spatial information (e.g., the percentage of darker pixels in some examples compared to others), while training on a non-fixed shuffled dataset allows models to train on only non-spatial information.

Figure 2:
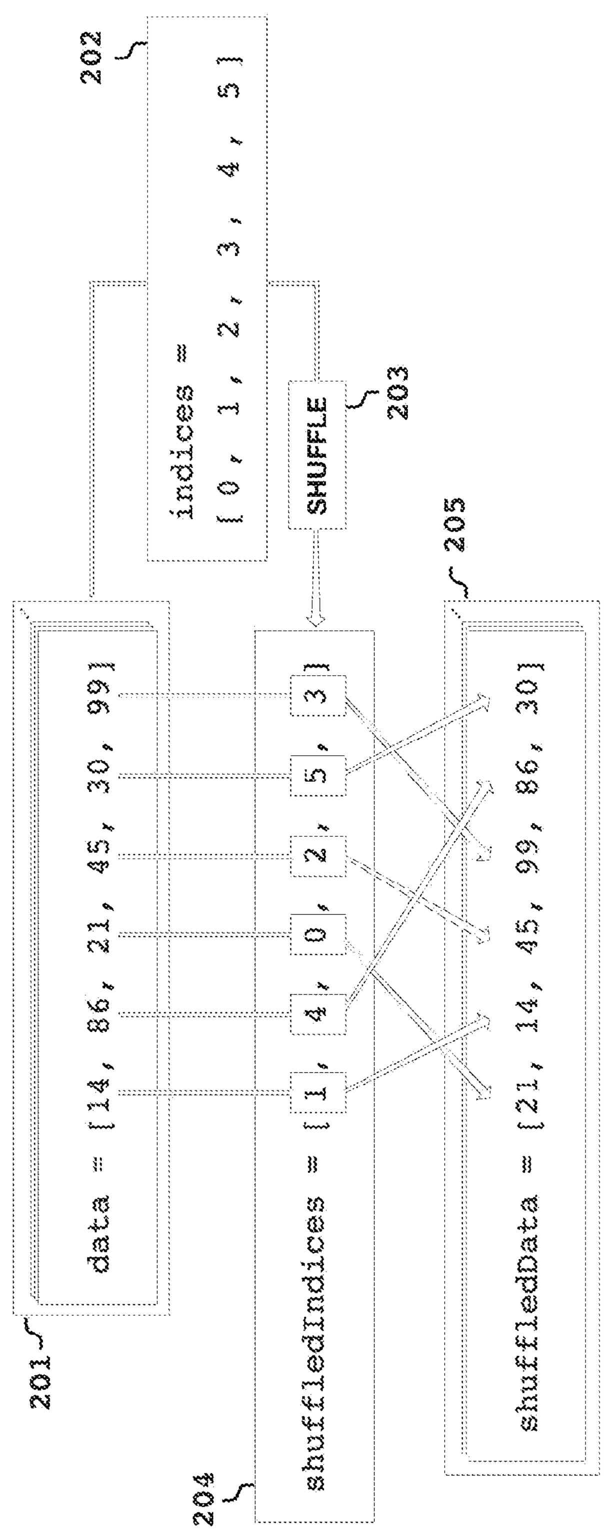
FIG. 2 illustrates the method of fixed shuffle processing of an input dataset.

For illustrative purposes, further details of the fixed shuffling method will be provided by reference to FIG. 2. The embodiment of method (1200) may be used to transform a previously padded and perturbed dataset as illustrated or may be used to transform a dataset that has been subjected to an arbitrary number of prior transformations of paddings, perturbations, or shuffles or random orthogonal matrix transformations as described herein. In alternate embodiments, a non-fixed random orthogonal matrix transformation is applied, wherein a different random orthogonal matrix transformation is applied to each example of the training and test datasets. It will be apparent to those skilled in the art that any number of random orthogonal matrix transformations, including fixed shuffling or another form of random orthogonal matrix transformation, combined with any number of non-orthogonal transformations yields an aggregate non-orthogonal transformation, wherein input vectors transformed to output vectors do not maintain unchanged vector lengths from input to output and do not maintain unchanged angles between vectors from input to output.

Method (40) yields predictions (112) that do not differ substantively in accuracy from those of methods (10), (20), or (30). Thus, for example, neural network (108) accepts image (1041), which is a modified image of a handwritten number 3, and generates a prediction (1121), which is the numeral "3", where prediction (1121) is the same as prediction (1091), (1101), and (1111).

It will be understood to those skilled in the art that the methods illustrated in FIG. 1B may be applied to any dataset of tensors of any degree (any number of input dimensions with any shape, and consisting of any suitable data type with any bit depth) and is not restricted to the example of two dimensional (x by y pixel) images shown in FIG. 1B for purposes of illustration. The process that is shown for illustrative purposes in FIG. 1C as a sequential application of padding, followed by perturbation, (as examples of non-orthogonal transformations), followed by shuffling (as an example of an orthogonal transformation) is one embodiment of the present invention, but these three categories of transformation (padding, perturbation, and shuffling or random orthogonal matrix transformation) may be in an arbitrary number of combinations or orders (for example, application of padding then shuffling, without perturbation; or application of non-fixed perturbation, then application of fixed padding, then application of a random orthogonal matrix transformation), and also may be applied iteratively (for example, application of shuffling, then padding, then perturbation, then a second round of shuffling). In preferred embodiments, at least one non-orthogonal transformation is applied to yield an aggregate non-orthogonal transformation. In preferred embodiments, at least one fixed shuffling or random orthogonal matrix transformation is applied in combination with at least one non-orthogonal transformation of padding or perturbation to yield an aggregate non-orthogonal transformation.

FIG. 2 illustrates the method of fixed shuffle processing of an input dataset. FIG. 2 shows, for illustrative purposes, displaying a small dataset (201) consisting of a 1-D array of 6 values for each example in the dataset (a rank 2 tensor consisting of a 6-dimensional vector by any number (n) examples). Taking the first example of the dataset (201) shown at the top of the stack, the indices of these 6 values are shown in (202), beginning, per usual convention in the art, with index 0. These indices are stored in an array (202) of the same size of the array shown in (201), and this array of indices is then subjected to a random shuffling algorithm (203) once, resulting in a shuffled index array (204) in which the index values are now found in a new position. The shuffled index array (204) is stored in memory and used to apply a fixed shuffle to each element of the full dataset (201), resulting in a fixed shuffled dataset (205). The fixed shuffle is applied by moving each value in each element of the dataset (201) to the new index position in (205) based on the index value found in the fixed shuffle index array (204). By inspection of FIG. 2, each value in the original array in (201) can be traced to its new position in (205) by way of the index value found in (204). For example, the value '86' in (201) is found at index=1 in (201), so the shuffled index value of '4' is obtained from the position of index=1 in (204), indicating that the value '86' should be placed in position index=4 in the shuffled dataset (205). As described above, the process of generating the shuffled index array (204) by shuffling (203) of the appropriately-shaped index array (202) is performed once for an entire dataset, and the identical shuffling process as illustrated in (201, 204, 205) is applied to each element of the dataset, yielding a fixed shuffle or index shuffle, which is an orthogonal matrix transformation. The shuffled index array (204) therefore represents a lookup table that can be encrypted by conventional methods, along with the corresponding lookup tables for padding and perturbation as described above. It will be apparent to those skilled in the art that the process of fixed shuffling can be applied to any dataset of tensors of any rank, either by the direct shuffling of arrays of the appropriate number of dimensions (e.g., the 1-D array shown in FIG. 2 or the 2-D image array shown in FIG. 1A, or arrays of any number of dimensions), or by first flattening a higher dimensional array to a 1-D array with the application of the 1-D array shuffling method as shown in FIG. 2, followed by reshaping back to the original number of array dimensions. For tensors containing example data with channels (e.g., multiple color channels for example images), in some embodiments, the same fixed shuffling index array is applied to each of the channels, and in other embodiments, a different fixed shuffling index array is applied to each of the channels, and in other embodiments, a single fixed index shuffling array is used that spans the multiple channels. Similarly, for application of random orthogonal matrix transformation to tensors containing example data with channels (e.g., multiple color channels for example images), in some embodiments, the same random orthogonal matrix transformation is applied to each of the channels, and in other embodiments, a different f random orthogonal matrix transformation is applied to each of the channels, and in other embodiments, a single fixed random orthogonal matrix transformation is used that spans the multiple channels.

Figure 3:
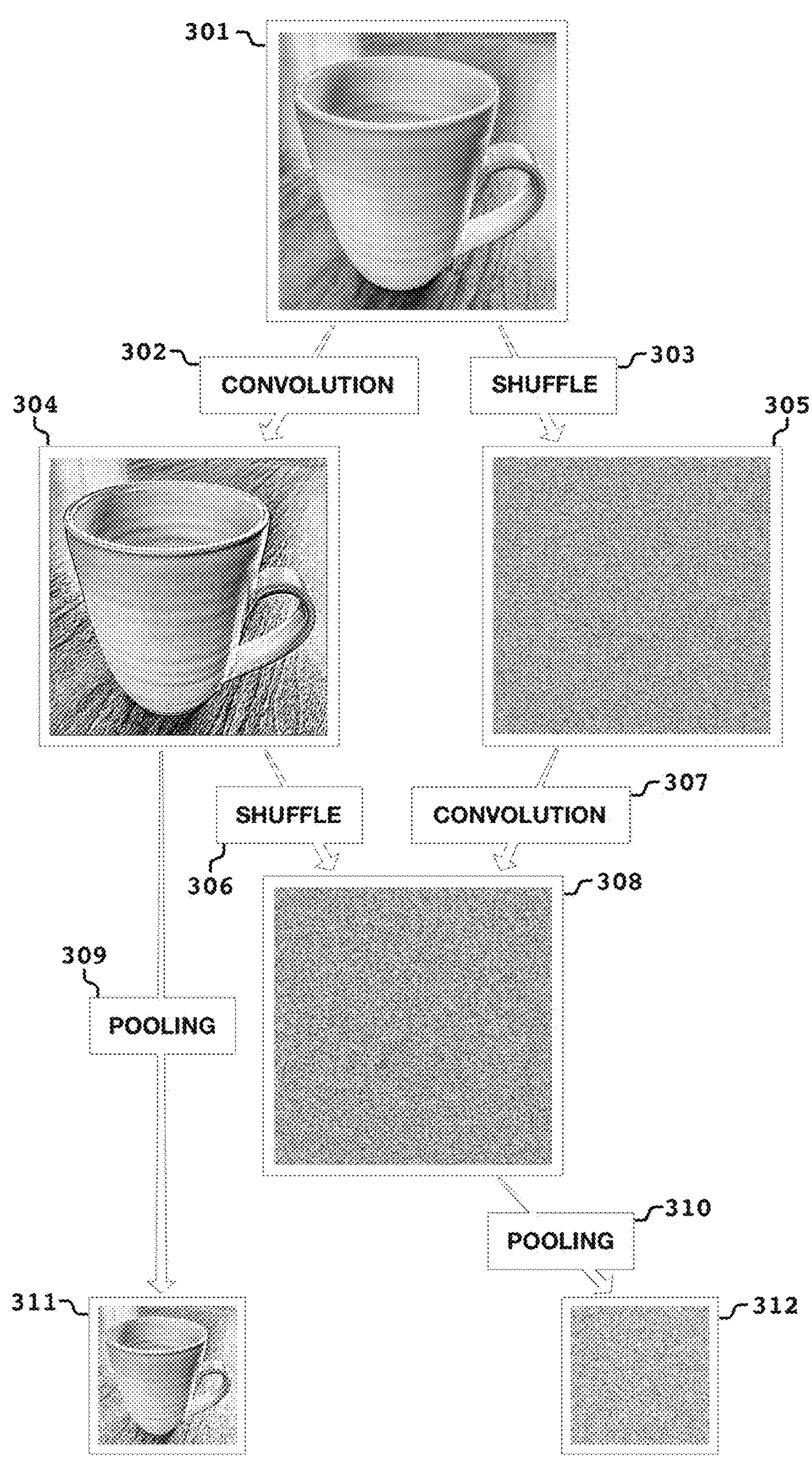
FIG. 3 illustrates methods to apply convolutions (filters) and pooling (downsampling) to datasets that have been transformed by padding, perturbation, and fixed shuffling or orthogonal matrix transformation processes.

FIG. 3 illustrates methods to apply convolutions (filters) and pooling (downsampling) to datasets that have been transformed by padding, perturbation, and fixed shuffle processes as described above. The feature manipulations known as convolutions and pooling are used in a subclass of ANNs, known as convolutional neural networks (CNNs), to achieve improved performance in image-recognition and other tasks involving datasets in which individual values in data elements have spatial relationships with other individual values. Convolution involves application of a convolution matrix filter, also known in the art as a kernel, to an original image, with the kernel representing a small grid of values that are used to transform the value of a pixel based on a mathematical formula using the values in the kernel grid and the values of pixels surrounding the pixel of interest. The result of the convolution process by standard methods known in the prior art is shown for purposes of illustration in FIG. 3, with transformation of an image (301) into an edge-enhanced image (304) by application of a standard convolution using a kernel that has the visual effect of edge-enhancement. Pooling involves creation of a smaller image from a larger one by using neighboring pixel values (e.g., a 2×2 grid of values) in the parent image to generate a single value in the resulting smaller image by taking, for example, the average of the (e.g., 2×2) grid of pixels or the maximum value of the (e.g., 2×2) grid of pixels. The result of applying a pooling transformation is a downsampled, smaller version of the original image, as shown in FIG. 3 for the transformations of the edge-enhanced image (304) by means of a standard 2×2 pooling operation known in the prior art (309) into a downsampled image (311) that is 25% the size of the original image (304). It will be apparent to those skilled in the art that an attempt to apply standard algorithms for convolution or pooling to a fixed shuffled dataset will not yield the desired result, because the fixed shuffling process has altered the relationship of the pixels in the shuffled image. Therefore, methods are presented in FIG. 3 (and described below, in further detail, with reference to FIG. 4) for applying modified convolution and pooling algorithms that use the stored lookup table of shuffled indices as described above to apply the modified convolution and modified pooling to preserve the spatial relationships present in the original image.

Application of a fixed shuffle (303) to the starting image (301) yields a shuffled image (305). Application of a modified convolution algorithm (307), in which the original pixel locations are determined by reference to the inverse of the stored fixed shuffle index array, to the shuffled image (305) yields a shuffled and convolved image (308). Application of a modified pooling algorithm (310), in which the original pixel locations are determined by reference to the inverse of the stored fixed shuffle index array, to the shuffled and convolved image (308) yields a shuffled, convolved, and pooled image (312) that has been downsampled. The convolutional and pooling algorithms applied by reference to the inverse of the stored fixed shuffle array may be applied sequentially, as shown in the illustrative example in FIG. 3, or separately, or in any order or combination.

In alternate embodiments, convolutions (302) of the unshuffled data (301) may be performed first, yielding convolved, unshuffled data (304), which may subsequently be subjected to fixed shuffling (306) to yield sets of convolved, fixed shuffled data (308). Application of a modified pooling algorithm (310), in which the original pixel locations are determined by reference to the inverse of the stored fixed shuffle index array, to the shuffled and convolved image (308) then yields a shuffled, convolved, and pooled image (312). In alternate embodiments, any number of convolutions or pooling operations may be applied to unshuffled data (or random orthogonal matrix untransformed data) prior to padding, perturbation, and fixed shuffling or random orthogonal matrix transformation, and in these embodiments, it is not necessary to transmit information regarding padding, perturbation, or fixed shuffling algorithms in order to perform model training.

Figure 4:
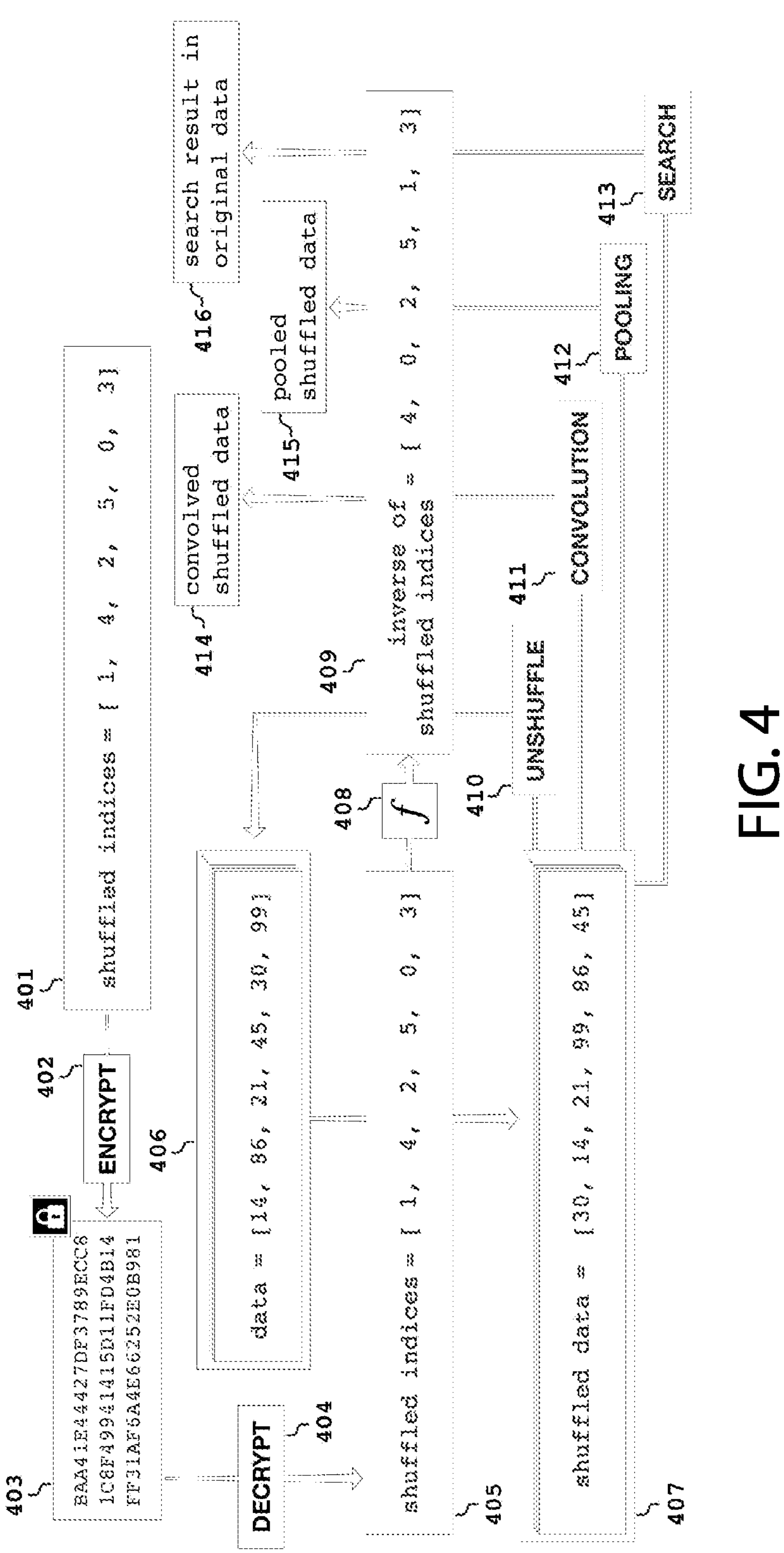
FIG. 4 illustrates methods to securely utilize shuffled indices and the inverse of shuffled indices to perform functions such as unshuffling, convolution, pooling, or search to fixed shuffled datasets.

FIG. 4 illustrates methods to securely utilize shuffled indices and the inverse of shuffled indices to perform functions such as unshuffling, convolution, pooling, or search to fixed shuffled datasets. A set of shuffled indices (401) are encrypted (402) by standard methods with one or more encryption keys to obtain a set of encrypted shuffled indices (403). The set of shuffled indices (401) shown is, for purpose of illustration, a short one-dimensional array of 6 values, but within the scope of the invention, the array of shuffled indices may be of any length and of any number of dimensions, and of any data type, suiting the size and shape of the input data arrays. The encrypted shuffled indices (403) may be stored and/or transmitted and subsequently decrypted (404) by a credentialed user or users with the appropriate key or keys to obtain the set of unencrypted shuffled indices (405). The shuffled indices (405) can be used to perform a fixed shuffle on the stack of input data (406), yielding a stack of fixed shuffled data (407). The shuffled indices (405) may also be converted to the inverse of the shuffled indices (409) by means of a function (408) that performs the following operation. The shuffled indices array (405) stores the shuffled index values at index positions of an array; the function (408) swaps the index values and index positions to yield the inverse of the shuffled indices array (409). As the shuffled indices array (405) may be used to apply a fixed shuffle to a stack of input data (406) to yield a stack of fixed shuffled data (407), so may the inverse of shuffled indices array (409) be used to unshuffle (410) a stack of fixed shuffled data to yield the original stack of data (406). The inverse of shuffled indices array acts as a lookup table that maps a value found in a fixed shuffled data array (407) back to its position in the original data array (406). For example, the position of value '14' shown in the illustrated shuffled dataset (407) corresponds to the position of value '0' in in the inverse of shuffled indices array (409), mapping the value '14' back to the 0th (initial) index position in the original data array (406). Fixed shuffled data (407) may be subjected to convolution (411) by using the inverse of shuffled indices (409) to map values in the fixed shuffled data (407) back to their positions in the original data (406), yielding convolved shuffled data (414). Similarly, fixed shuffled data (407) may be subjected to pooling (412) by using the inverse of shuffled indices (409) to map values in the fixed shuffled data (407) back to their positions in the original data (406), yielding pooled shuffled data (415). Fixed shuffled data (407) may be subjected to programmatic search (413) by using the inverse of shuffled indices (409) to map values in the fixed shuffled data (407) back to their positions in the original data (406), yielding the locations of any search results in the original data (416).

In the above examples, the inverse of shuffled indices (409) is used to map values in the fixed shuffled data (407) back to their positions in the original data (406) for purposes of unshuffling, convolution, pooling, or search. In alternative embodiments, the analogous operation may be performed on data treated by random orthogonal matrix transformation, by using matrix·vector multiplication between the transformed vectors and the transpose of the random orthogonal matrix (known in the art to be equivalent to the inverse of the random orthogonal matrix). In these embodiments, the process of transforming the examples of a dataset by multiplication of the input vectors by the random orthogonal matrix may be reversed to obtain the original vectors from the transformed vectors by multiplying the transformed vectors by the transpose of the random orthogonal matrix (equivalent to the inverse of the random orthogonal matrix).

The inverse of the shuffling index array (409) functions as a 'lookup table' to locate components of a search in the original data. Thus, for example, the method includes, for each element of a search, locating the element in the padded/shuffled data, then using the inverse of the padding, perturbation, and shuffling index arrays to determine the location of the element's match in the original data. In alternative embodiments, the transpose of a random orthogonal matrix is used in analogous fashion, as described above.

Figure 5:
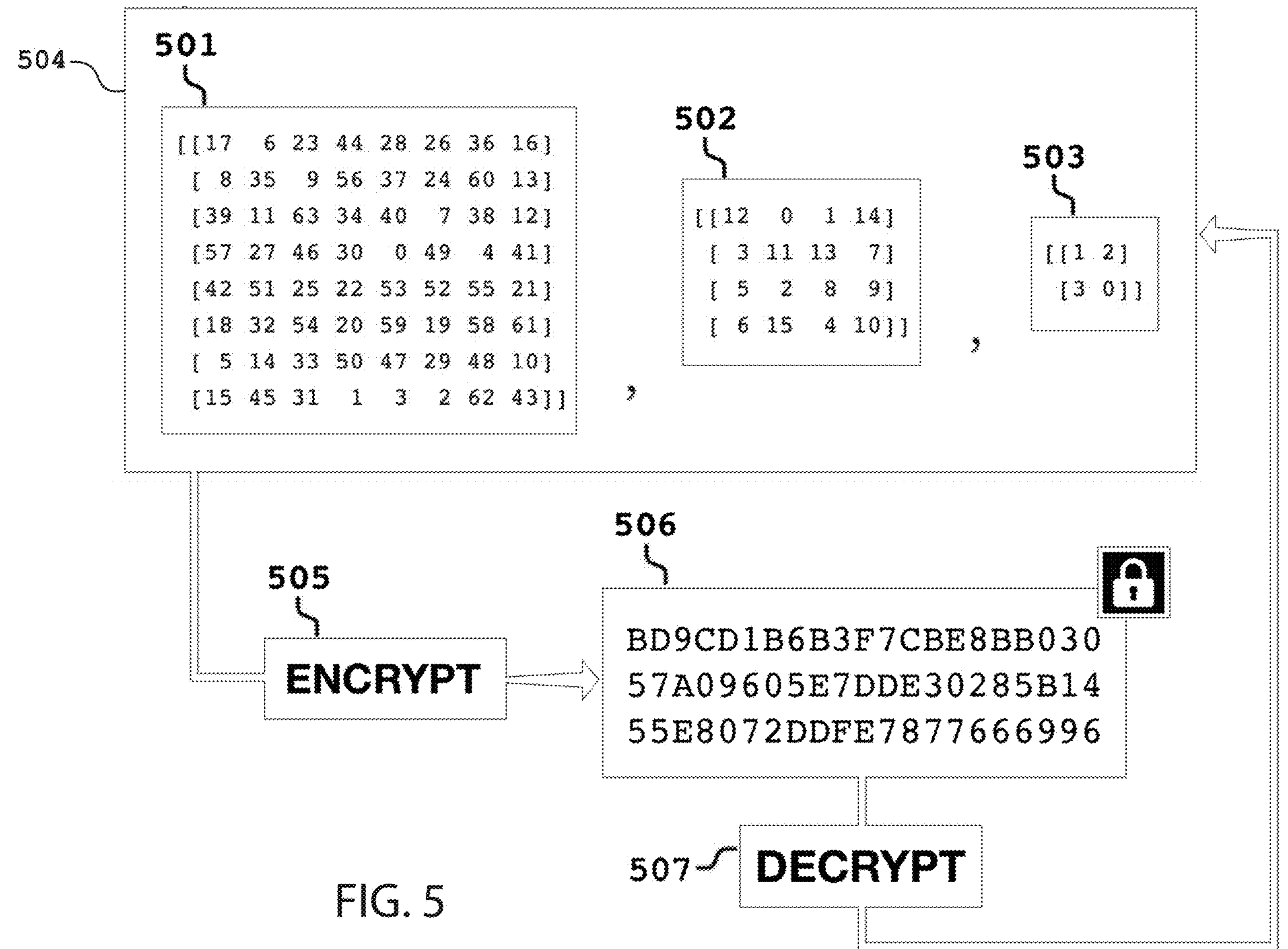
FIG. 5 illustrates methods to securely store and transmit packages of shuffled indices corresponding to the different sizes of data arrays created by pooling.

FIG. 5 illustrates methods to securely store and transmit packages of shuffled indices corresponding to the different sizes of data arrays created by pooling. As known in the art and described above, pooling (downsampling) a data array has the effect of reducing the size of the data array. In the example of 2×2 pooling of a two-dimensional data array or image, the data array or image is reduced to 25% of the original size (a 50% reduction in each of the two dimensions). Where it is desirable to apply pooling functions in a neural network used for training on fixed shuffled data, separate fixed shuffled index arrays are generated for each data array or image size (original size and any pooled sizes). For purpose of illustration, an 8×8 data array storing shuffled indices (501) is shown. It will be recognized by those skilled in the art that the array of shuffled indices may be of any size and any number of dimensions, to suit the shape of the input data used. A corresponding 4×4 data array storing shuffled indices (502) is also shown, as is a corresponding 2×2 data array storing shuffled indices (503). The three shuffled index arrays (501, 502, 503) are used for fixed shuffling of, in this illustrative example, an original data array with shape 4×4×(n examples), a 2×2 pooled version of shape 4×4×(n examples), and a subsequent 2×2 pooled version of shape 2×2×(n examples). The shuffled indices arrays (501, 502, 503) are collected in a data object (504) that in turn is encrypted (505) by standard methods to an encrypted data object (506) that may be decrypted (507) back to the original data object (504) for data preparation and use in ANN training and prediction. In alternative embodiments, orthogonal matrices used to encode sequentially pooled data are encrypted and decrypted in analogous fashion.

In various embodiments, the data object (504) subjected to encryption by standard methods (505) also contains corresponding data elements representing one or more padding elements and one or more perturbation arrays. In various embodiments, padding elements are stored for the original data shape prior to fixed shuffling (as encoded by 501) along with data stored to indicate the position of the padding element relative to the original data. In other embodiments, padding elements are similarly stored relative to the other levels of fixed shuffling (502, 503). In various embodiments, perturbation arrays are stored for the original data shape prior to fixed shuffling (as encoded by 501). In other embodiments, perturbation arrays are similarly stored relative to the other levels of fixed shuffling (502, 503). In alternative embodiments, padding elements and perturbation arrays are similarly stored relative to orthogonal matrices.

In various embodiments, data are prepared for use with ANNs using fixed shuffling or random orthogonal matrix transformation; in other embodiments, data are prepared for use with ANNs using padding and fixed shuffling or random orthogonal matrix transformation; in other embodiments, data are prepared for use with ANNs using perturbation and fixed shuffling or random orthogonal matrix transformation; and in other embodiments, data are prepared for use with ANNs using padding, perturbation, and fixed shuffling or random orthogonal matrix transformation. In additional embodiments, data are prepared for use with ANNs using various combinations of the three methods of padding, perturbation, and fixed shuffling or random orthogonal matrix transformation in various orders, including, in additional embodiments, iterative use of two or more rounds of any of the three methods. Different forms of padding (for example, fixed padding and non-fixed padding) may be applied serially and in combination with other transformations described herein, and different forms of perturbation (for example, fixed perturbation and non-fixed perturbation) may be applied serially and in combination with other transformations described herein. In additional embodiments, data are prepared for use with ANNs using different combinations of any of the transformations of fixed padding, non-fixed padding, fixed perturbation, non-fixed perturbation, fixed shuffling, and random orthogonal matrix transformation, in various orders and in various numbers of iterations.

In alternative embodiments, sets of convolutions and/or pooling operations are applied to the data prior to padding (if applied), perturbation (if applied), and fixed shuffling or random orthogonal matrix transformation, generating training and test tensors that contain securely encoded forms of the original data as well as any number of convolved and/or pooled forms of the data, stored in tensors of higher rank than the original tensors. In these alternative embodiments, access to fixed shuffling indices and other indices (lookup tables) is not required at training, test, or inference time, thereby simplifying security workflows as only tensors containing convolutions, pooling, and original data all subjected to padding (if applied), perturbation (if applied), and fixed shuffling or random orthogonal matrix transformation are transmitted for training and testing.

In various embodiments, the transformation of data as described in detail above (using various combinations of the transformations of padding, perturbation, and fixed shuffling or random orthogonal matrix transformation) is applied to data for use with other forms of machine learning algorithms beyond the domain of ANNs, including, but not limited to, algorithms supporting supervised machine learning, unsupervised machine learning, and reinforcement machine learning, such as linear regression, polynomial regression, logistic regression, support vector machines, naive Bayes, decision trees, random forests, k-Nearest Neighbors, and ensemble learning approaches.

FIG. 6 illustrates methods to prepare data for storage and transmission in fixed shuffled packets for use with programmatic search. The programmatic search methods described with reference to FIG. 6 are generally similar to the programmatic search methods described and shown with reference to FIG. 4. Elements of FIG. 6 having the same name as elements of FIG. 4 are generally the same, except where explicitly stated.

For illustrative purposes, an original one-dimensional data array (606) containing 14 integer values is shown. It will be apparent to those skilled in the art that the data array may have any number of dimensions, with any number of values per dimension, and may store data in integer form, floating point value form, or in the form of another data type. For use with fixed shuffling or random orthogonal matrix transformation and programmatic search, the original data array (606) is reshaped (607) into packets (608) of smaller size than the original data array. It will be apparent to those skilled in the art that the packet size may be any size that is smaller than the original data (606) size. For purpose of illustration, a packet size of 6 values is shown (608), converting the one-dimensional 14-value original dataset (606) into a two-dimensional packetized dataset (608) of 3 packets of 6 values each, where, for illustrative purposes, zero or Null values are appended to the final packet to bring the length of the final packet to 6 values. To perform fixed shuffling on the packetized dataset (608), a shuffled indices array (601) of length corresponding to the packet size is subjected to encryption by standard methods (602) with one or more encryption keys to yield an encrypted shuffled indices array (603) that may be stored or transmitted. The encrypted shuffled indices array (603) is decrypted (604) with one or more keys to yield the unencrypted shuffled indices array (605). The packetized data array (608) is subjected to a fixed shuffle (609) using the shuffled indices array (605), yielding a fixed shuffled packetized data array (610). In the illustrative example, each row of the packetized data array (608) is subjected to the same shuffle according to the shuffled indices array (605), so that a given column of values in the original packetized data array (608) is moved together to a new column position in the fixed shuffled packetized data array (610). As described with reference to FIG. 4 above, to perform programmatic search, the inverse of the shuffled indices (612) is generated by a function (611) that swaps the index values and index positions in the shuffled indices array (605). Programmatic search (613) is then performed by means of the inverse of shuffled indices array (612) to yield a search result (614) in the original data. For example, using the values shown in the illustration, a search for sequence '14, 86, 21' in the fixed shuffled packetized data (610) could first determine the locations of the initial value '14' in the fixed shuffled packetized data (610), then convert the locations of these values in the original packetized data (608) using the inverse of shuffled indices lookup table (612), then look ahead for adjacent values '86' and '21' by the same lookup process. By this process, the location of the search sequence '14, 86, 21' in the fixed shuffled packetized data (610) will be determined to start at the 0th (initial) position of the 0th (initial) packet (row) of the original packetized data (608), corresponding to the 0th (initial) position in the original data (606). The process of looking ahead for adjacent values in this example takes into account the relationship of the end of one packet (row) in the unshuffled packetized data (608) with the beginning of the next packet (row) in the unshuffled packetized data (608), determined using the lookup via the inverse of the shuffled indices array (612), so search sequences crossing packet boundaries (for example, '98, 68, 14') are identified and the location of the search sequence is be determined in the original data (606). In alternative embodiments, packetized data are encoded by random orthogonal matrix transformation and at search time, the transpose of the random orthogonal matrix (equivalent to the inverse of the random orthogonal matrix) is used in analogous fashion to perform search.

In various embodiments, the shuffled indices (601) subjected to encryption by standard methods (602) are accompanied prior to encryption by a collection of corresponding data elements representing a padding element and/or a perturbation array. In various embodiments, a padding element is stored for the original data shape prior to fixed shuffling by the shuffled indices (601) along with data stored to indicate the position of the fixed padding element relative to the original data. In various embodiments, a perturbation array is stored for the data shape prior to fixed shuffling by the shuffled indices (601).

In various embodiments, data are prepared for programmatic search using packetization and fixed shuffling or random orthogonal matrix transformation alone; in other embodiments, data are prepared for programmatic search using packetization, padding, and fixed shuffling or random orthogonal matrix transformation; in other embodiments, data are prepared for programmatic search using packetization, perturbation, and fixed shuffling or random orthogonal matrix transformation; and in other embodiments, data are prepared for programmatic search using packetization, padding, perturbation, and fixed shuffling or random orthogonal matrix transformation. In various embodiments, following packetization, the three methods of padding, perturbation, and fixed shuffling or random orthogonal matrix transformation are applied in various combinations, and optionally, iterative application of two or more rounds of any of the three methods is performed. In various embodiments, the trailing zeroes shown for purposes of illustration in FIG. 6 as appended to the original data (606) to yield the unshuffled packetized data (608) with uniform packet size are instead a randomly generated sequence, and the beginning or totality of this randomly generated sequence is stored in encrypted form along with the encrypted shuffled indices to facilitate later separation of original data from the appended random sequence by establishing an end-of-file (EOF) sequence. In further embodiments, the statistical distribution of randomly generated values that are appended to the original data (606) to create uniform packet size may be constrained by considerations such as the statistical distribution of values in the parent dataset.

Figure 7:
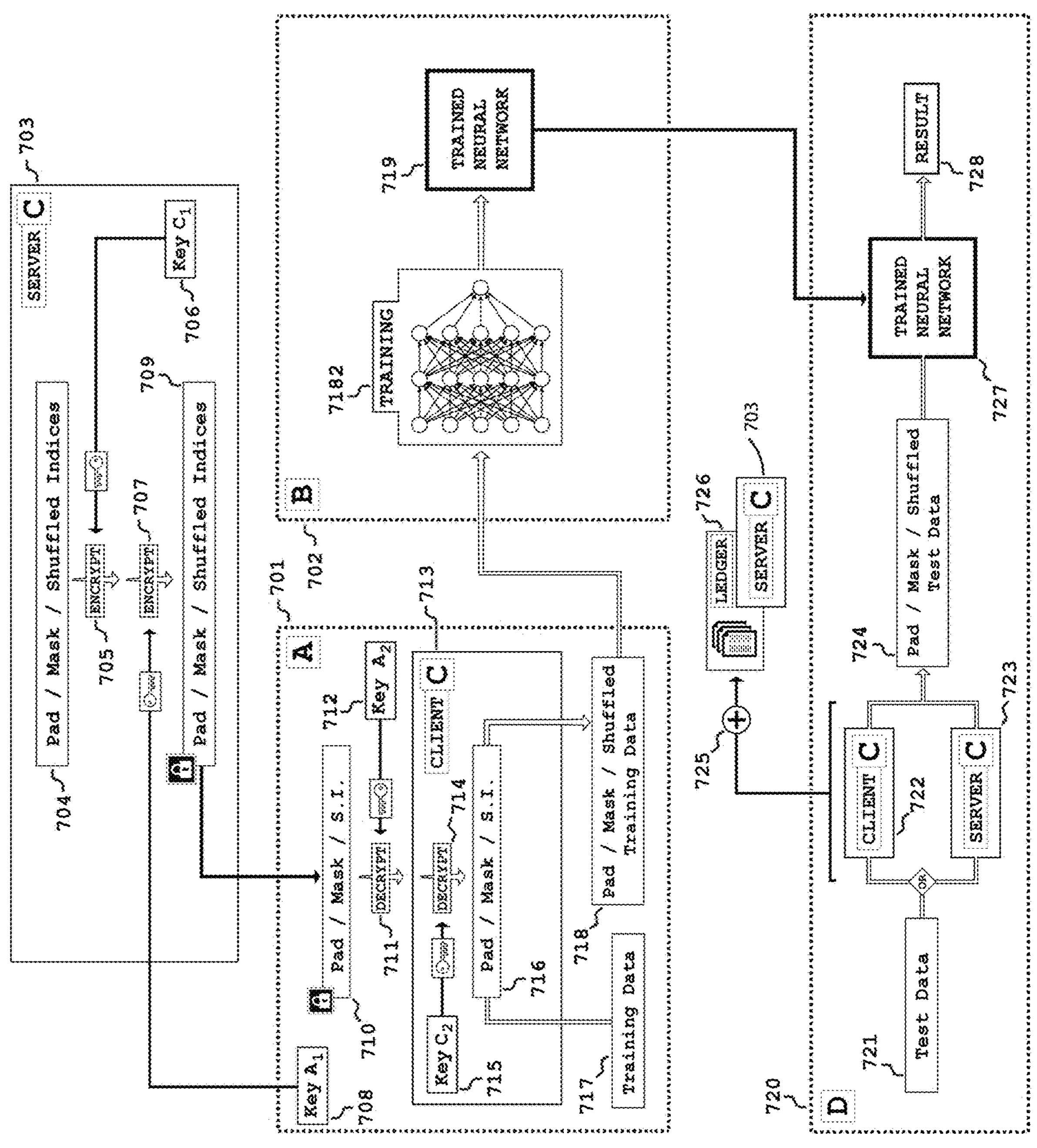
FIG. 7 illustrates a system in which multiple parties may use secure data for training and implementation of artificial neural networks.

FIG. 7 illustrates a system in which multiple parties may use secure data for training and implementation of AANs using a computer. Thus, for example and without limitation, an Entity A operates a computer A (701), an Entity B operates a computer B (702), and a Third-Party C operates a server C (703). Computer A (701), computer B (702), and server C (703) each include memory and processors that are networked which are programmed, for example and without limitation, to perform the following functions.

An Entity A has sensitive data stored on computer A (701) that it wishes to secure for training in an ANN established by an Entity B on computer (702). Server C (703) establishes the required padding, perturbation, and shuffling indices or random orthogonal matrix (704), in accordance with the project data specifications (such as data shape) provided by Entity A and the project training specifications (such as convolutions and/or pooling required) provided by Entity B. The padding, perturbation, and shuffling indices or random orthogonal matrix (704) are then encrypted and decrypted using standard key pair encryption methods known in the art, as follows. The padding, perturbation, and shuffling indices or random orthogonal matrix (704) are encrypted (705) with a Key C1 (706) belonging to Third Party C, then encrypted (707) with a Key A1 (708) belonging to Entity A that is passed from computer A (701) to server C (703), yielding an encrypted version of the padding, perturbation, and shuffling indices or random orthogonal matrix (709). A copy of the encrypted padding, perturbation, and shuffling indices or random orthogonal matrix (710) is passed from server C (703) to computer A (701), where a decryption step (711) is performed with the second component of a key pair, Key A2 (712), belonging to Entity A. The result of this first decryption step is passed to a local client software (713) that was previously established by Third Party C, and which is running behind the firewall of computer A. Within the local client software C (713), a second decryption step (714) is performed using the second component of a key pair, Key C2 (715), belonging to Third Party C and stored in the local client software (713), yielding a decrypted version of the padding, perturbation, and shuffling indices or random orthogonal matrix (716) that corresponds to the original padding, perturbation, and shuffling indices or random orthogonal matrix (704) generated in the server belonging to Third Party C. Training data (717) stored on computer A (701) is then passed to the local client software (713) and transformed by means of the padding, perturbation, and shuffling indices or random orthogonal matrix (716) to yield padded, perturbed, and fixed shuffled or random orthogonal matrix transformed training data (718) that is passed back to computer A (701). The padded, perturbed, and fixed shuffled or random orthogonal matrix transformed training data (718) are then transmitted to computer B (702) for training of an ANN (7182) to yield a trained neural network (719).

In alternate embodiments, the padded, perturbed, and shuffled or random orthogonal matrix transformed training data (718) are transmitted directly from the local client software (713) to the neural network (7182) running in software controlled by Entity B on computer B (702). In other alternate embodiments in which Entity A is not required to be part of the encryption and decryption process for the encrypted padding, perturbation, and shuffling indices or random orthogonal matrix (709), standard public/private key pair encryption such as RSA are applied to securely transmit the encrypted padding, perturbation, and shuffling indices or random orthogonal matrix (709) between the server C (703) and the local client software (713).

For use of the trained neural network to analyze test data, Software D (720) is generated that takes test data (721) and transforms the data into padded, perturbed, and fixed shuffled or random orthogonal matrix transformed test data (724) using either client software C (722) or server software C (723) to transform the data as described above. When this transformation takes place, this event is recorded (725) into a ledger maintained in server software C (726), and both Entity A, via computer A (701) and Entity B, via computer B (702) have access to this ledger, by means of permissioned access to a private file maintained in server software C (726) or by alternative technologies known in the art, such as permissioned blockchain. The padded, perturbed, and fixed shuffled or random orthogonal matrix transformed test data (724) is then processed using a copy of the trained neural network (727) passed from computer B (702) to Software D (720), to yield a result (728). In alternate embodiments, the yielding of the result (728) from the trained neural network (727) is recorded in the ledger maintained in server software C (726), in place of, or in addition to, the recordation of the data transformation event (725).

Figure 8:
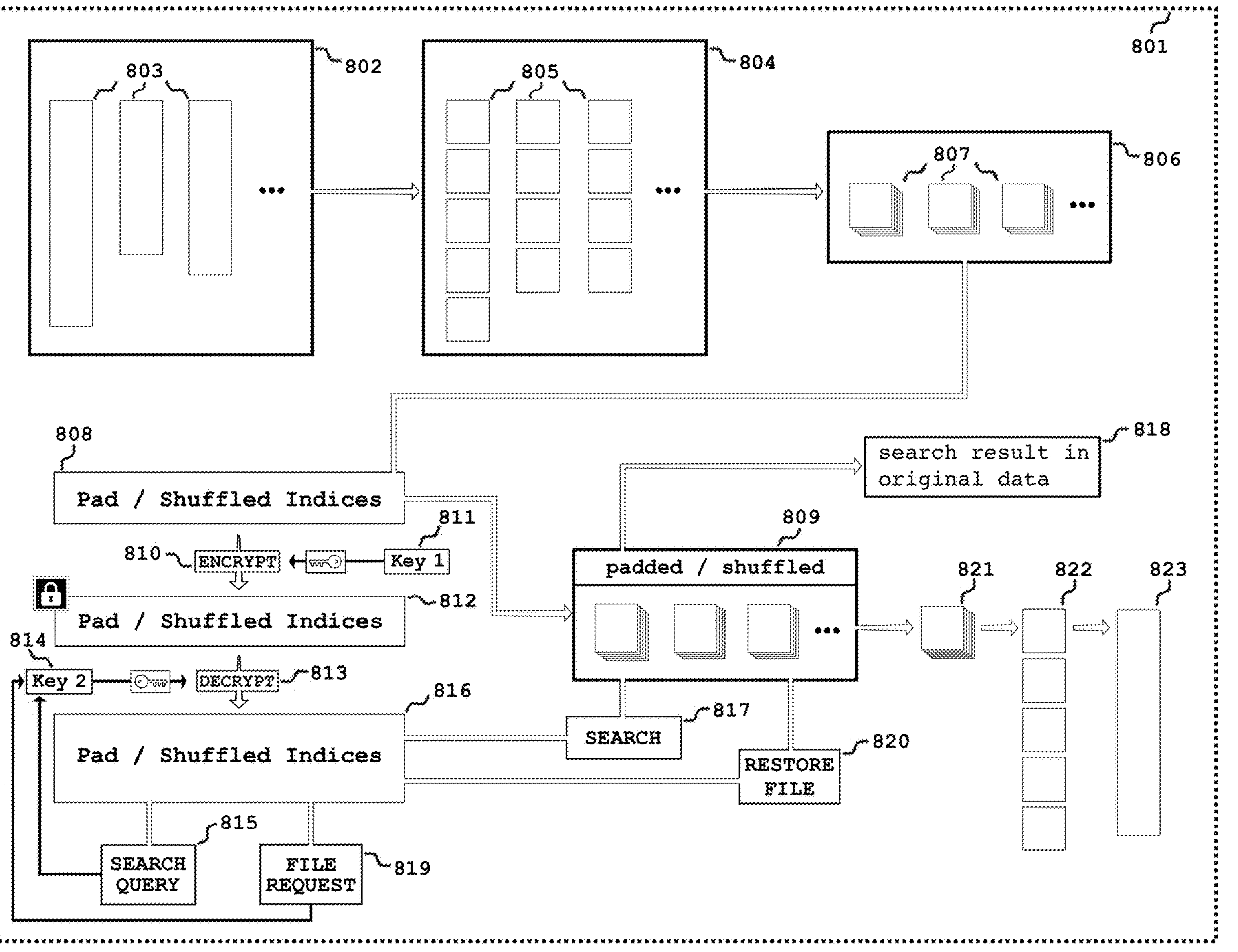
FIG. 8 illustrates a system wherein files on a computer system or cloud service may be stored securely in a format that allows for search and file restoration by credentialed users.

FIG. 8 illustrates systems wherein files on a computer system or cloud service may be stored securely in a format that allows for search and file restoration by credentialed users. The system components include memory and processors that are networked which are programmed, for example and without limitation, to perform the following programmatic search methods illustrated in FIG. 8 are generally similar to the programmatic search methods described and shown with reference to FIGS. 4 and/or 6. Elements of FIG. 8 having the same name as elements of FIGS. 4 and/or 6 are generally the same, except where explicitly stated.

On a computer system or cloud service (801), an unencrypted memory storage (802) contains any number of files (803) stored in memory in conventional unencrypted form. As depicted for purposes of graphical illustration by the height of the rectangles representing individual data files (803), the unencrypted files may be of arbitrary size. An initial transformation step is performed on the files (803) in memory storage (802) to subdivide a copy of the files (803) into packetized form (805) in memory storage (804), with packets of uniform size as illustrated graphically (805). The uniform-sized file packets (805) in memory storage (804) are then transformed into data arrays (807) with the shape determined by ([packet size]×[number of packets]) in memory storage (806). In a preferred embodiment, padding data and fixed shuffle indices or random orthogonal matrix (808) are generated that correspond to the data shape of the arrays (807), in the fashion described in detail above, and stored temporarily for use in transforming the data arrays (807) in memory storage (806) into padded and fixed shuffled or orthogonal matrix transformed data arrays (809). In addition, the padding and fixed shuffling indices (808) are encrypted (810) using a first key of a key pair, Key 1 (811) to yield encrypted padding and fixed shuffling indices or random orthogonal matrix (812). After generation of the encrypted padding and fixed shuffling indices or random orthogonal matrix (812), the original padding and fixed shuffling indices or random orthogonal matrix (808) are deleted from memory.

When a search query (815) is produced by a credentialed user, a second key of a key pair, Key 2 (814) is used to decrypt (813) the encrypted padding and fixed shuffling indices or random orthogonal matrix (812) to yield a decrypted version of the padding and fixed shuffling indices or random orthogonal matrix (816). The padding and fixed shuffling indices or random orthogonal matrix (816) are then applied to the search query process as described above with reference to FIG. 6 and the result is used to perform a search (817) on the padded and fixed shuffled or random orthogonal matrix transformed data arrays (809) to yield a search result in the original data (818) using the method described in detail above. After the search is performed, the decrypted padding and fixed shuffling indices or random orthogonal matrix (816) are deleted from memory.

When a file request (819) is produced by a credentialed user, a second key of a key pair, Key 2 (814) is used to decrypt (813) the encrypted padding and fixed shuffling indices or random orthogonal matrix (812) to yield a decrypted version of the padding and fixed shuffling indices or random orthogonal matrix (816). The file request (819) is then addressed using the decrypted padding and fixed shuffling indices or random orthogonal matrix (816) to restore the requested file (820) from the padded and fixed shuffled or random orthogonal matrix transformed data arrays (809), to yield an unpadded and unshuffled/orthogonal matrix untransformed data array for the requested file (821). The unpadded and unshuffled/orthogonal matrix untransformed data array for the requested file (821) is then transformed into the corresponding data packets of fixed size (822), which are then rejoined to yield the original file (823). After restoration of the original file (823), the decrypted padding and fixed shuffling indices or random orthogonal matrix (816) are deleted from memory. In alternative embodiments for implementation of secure search and file restoration, perturbation is performed in combination with the padding and fixed shuffling or random orthogonal matrix transformation, as described in detail above.

Figure 9:
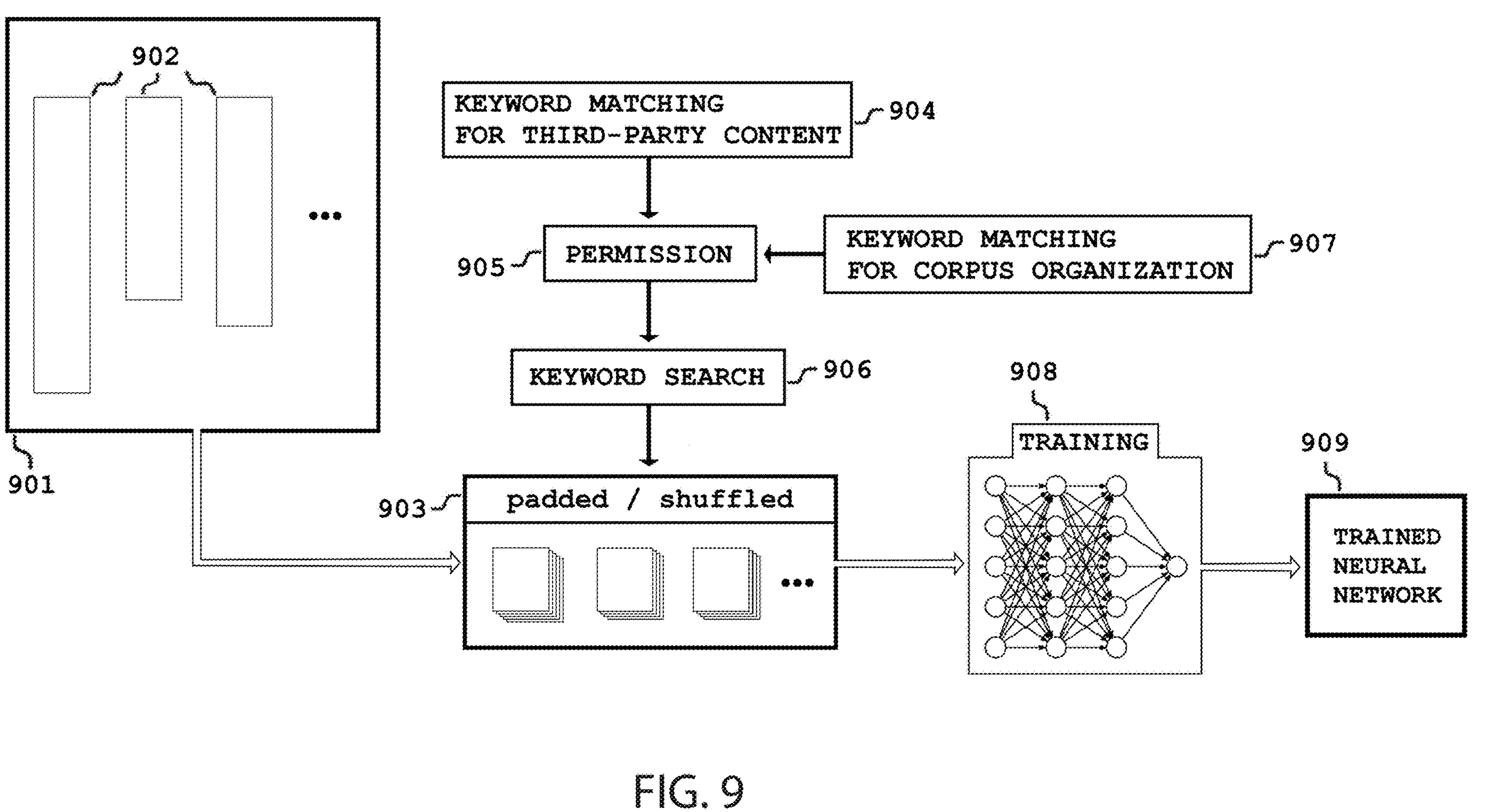
FIG. 9 illustrates a system wherein files, messages, posts, notes, or other electronic communications on a mobile, online, Web-based, or cloud-based electronic communication system or computer system or cloud service may be stored securely in a format that allows for keyword matching search and secure neural network training by permissioned entities.

FIG. 9 illustrates systems wherein files, messages, posts, notes, or other electronic communications on a mobile, online, Web-based, or cloud-based electronic communication system or computer system or cloud service may be stored securely in a format that allows for keyword matching search and secure neural network training by permissioned entities. The components of FIG. 9 include memory and processors that are networked which are programmed, for example and without limitation, to functions described herein. It will be apparent to those skilled in the art that the disclosed invention to secure data in searchable form and the disclosed invention to secure data for training neural networks, alone or in combination, yield certain advantageous embodiments of potential commercial interest. In one such embodiment, a mobile, online, Web-based, or cloud-based electronic communication system or other storage medium (901) contains a corpus of any number of data files, messages, posts, notes, or other electronic communications (902), and these are converted according to the methods disclosed above into a packetized and padded and fixed shuffled or orthogonal matrix transformed corpus (903). Where it is desirable to obtain keyword matching for third-party content (904) (including, but not limited to, advertising content), permissions (905) are obtained, and keyword search (906) is performed according to the methods disclosed above. The use of the term 'keyword' as used here includes any search for a content match of interest in the secured data contained in the padded and fixed shuffled corpus (903), including any data pattern of interest in data type stored therein, including binary or machine representations, text, images, video, or other forms of matchable digital content. In similar fashion, keyword matching may be performed for other purposes, including, but not limited to, content organization within the corpus of information (907). Because the padded and fixed shuffled or random orthogonal matrix transformed corpus of information (903) is organized into data arrays of fixed shape, as disclosed above, the fixed-shape packets of padded and fixed shuffled or random orthogonal matrix transformed data (903) may be used to train a neural network (908) to yield a trained neural network (909). In certain embodiments, the neural network (908) implemented in this context represents unsupervised machine learning to organize the data contained in the padded and fixed shuffled or random orthogonal matrix transformed corpus of information (903). In other embodiments, the neural network (908) implemented in this context represents supervised machine learning using labels obtained from metadata, user-provided data, the results of programmatic keyword matching (904, 907), or other data sources of interest. In other embodiments, the neural network (908) implemented in this context represents other types of machine learning approaches known in the art, including, but not limited to, unsupervised learning, semi-supervised learning, dimensionality reduction, anomaly detection, or reinforcement learning. As described above for the other machine learning processes disclosed in the present invention, the neural network (908) implemented in this context may be, in alternative embodiments, another form of machine learning algorithms outside the domain of ANNs, including, but not limited to, algorithms supporting supervised machine learning, unsupervised machine learning, and reinforcement machine learning, such as linear regression, polynomial regression, logistic regression, support vector machines, naive Bayes, decision trees, random forests, k-Nearest Neighbors, and ensemble learning approaches.

The nonorthogonal transformations taught herein as a combination of one or more nonorthogonal transformations (including fixed padding, non-fixed padding, fixed perturbation, and non-fixed perturbation) with one or more orthogonal transformations (including fixed shuffling or another random orthogonal matrix transformation or non-fixed shuffling or another random orthogonal matrix transformation) establish a secure method to encode data for training, testing, and inference using artificial neural networks. As discussed above, application of an orthogonal matrix transformation to transform input vectors into encoded vectors is a type of square matrix linear transformation, and this type of transformation has an intrinsic security weakness: a potential attacker that can present n input vectors of length n to the unknown linear transformation may obtain n encoded vectors of length n, and may, in presence of n input vectors and n encoded vectors, algebraically determine the exact linear transformation matrix that performed the encoding, breaking the security of this approach using linear algebraic manipulation that is well-established in the art. Specifically, the potential attacker, having presented n input vectors of length n to the transforming algorithm to obtain n encoded vectors of length n, may form a square (n×n) input vector matrix and also form a square (n×n) encoded vector matrix, then calculate the inverse of the square input vector matrix by well-established methods, then perform matrix multiplication between the encoded vector matrix and the inverse of the input vector matrix to explicitly solve for the unknown orthogonal matrix transformation. This approach is entirely dependent on the linear nature of the unknown matrix transformation, and non-linear transformations such as the non-orthogonal transformations taught herein are not subject to this linear algebraic method of solving for the unknown transformation. For example, application of fixed or non-fixed padding applied before an orthogonal matrix transformation yields a non-orthogonal and nonlinear transformation in which input vectors and encoded vectors no longer have the same number of dimensions, so it is impossible to generate an input vector matrix and a corresponding output vector matrix that are of the same shape, and thus it is impossible to solve for the unknown transformation using linear algebraic manipulation. Any number of nonorthogonal transformations (fixed padding, non-fixed padding, fixed perturbation, and/or non-fixed perturbation) applied in concert with one or more orthogonal transformations yield an aggregate nonorthogonal transformation that is also non-linear transformation that cannot be attacked by the linear algebraic method described above. Nonorthogonal transformed vectors, generated using the transformations taught herein, do not maintain vector lengths and angles between vectors, but despite this, neural network training still proceeds with only very minimal decrement of validation accuracy.

The present invention is not intended to be limited to a system or method which must satisfy one or more of any stated or implied objects or features of the invention. Modifications and substitutions by one of ordinary skill in the art are considered to be within the scope of the present invention. Numerous details are provided to convey an understanding of the embodiments described herein. It will be understood by those of ordinary skill in the art that the embodiments described herein may be practiced without these specific details. In other instances, well-known methods, procedures, and components have not been described in detail so as not to obscure the embodiments described herein. The present invention is not limited to the preferred, exemplary, or primary embodiment or embodiments described herein.

It will also be understood by one of ordinary skill in the art that the systems and methods may be provided on many different types of computer-readable media including computer storage mechanisms that contain instructions for use in execution by a processor to perform the methods' operations and implement the systems described herein. Any unit, component, computer, module, server, terminal, or device described or exemplified herein that executes instructions may include or otherwise have access to computer readable media such as storage media, computer storage media, or data storage devices (removable and/or non-removable, volatile and/or non-volatile) such as, for example, CD-ROM, diskette, RAM, ROM, EEPROM, flash memory, computer hard drive, magnetic disks, optical disks, tape, or other memory technology implemented in any method for storage or transmission of information, such as computer readable instructions, data structures, program modules, or other data. Any such computer storage media may be part of the device or accessible or connectable thereto. Any application or module herein described may be implemented using computer readable and/or executable instructions that may be stored or otherwise held by such computer-readable media.

With respect to the appended claims, unless stated otherwise, the term "first" does not, by itself, require that there also be a "second." Moreover, reference to only "a first" and "a second" does not exclude additional items. While the particular computer-based systems and methods described herein and described in detail are fully capable of attaining the above-described objects and advantages of the invention, it is to be understood that these are the presently preferred embodiments of the invention and are thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one," unless otherwise so recited in the claim.

Although the invention has been described relative to specific embodiments thereof, there are numerous variations and modifications that will be readily apparent to those skilled in the art in light of the teachings presented herein.

The invention claimed is:

1. A method for using modified data with a neural network, the method comprising:

for each example of a plurality of examples, generating, by one or more processors executing stored instructions, a corresponding transformation of a plurality of transformations, where each transformation of the plurality of transformations is a combination of one or more orthogonal transformations and one or more nonorthogonal transformations, where the one or more orthogonal transformations are the same for each transformation of the plurality of transformations, where each example is a training example of a plurality of training examples or a test example, where each example of the plurality of examples includes a stored array of values having n elements, where each transformation of the plurality of transformations includes a plurality of pads of values having p elements, where at least one pad of values corresponding to at least one training example differs from each of the other pads of values corresponding to the other training examples, where a modifying each example according to the corresponding transformation includes, by means of one or more processors executing stored instructions, an appending operation of appending the corresponding pad of values to the example and one or more orthogonal operations of applying the one or more orthogonal transformations to the example, to form a modified example having n+p elements, where each operation is applied to the values as presented to that operation, such that each example that is modified undergoes a transformation that increases the size of the example from n elements to n+p elements, and where the transformation includes at least one appending operation that precedes at least one of the one or more orthogonal operations such that the at least one orthogonal operation acts on an array of more than n elements, and such that at least one training example is modified with a different pad of values than the other training examples, where the corresponding pad of values for each example comprises a plurality of non-zero values, and is generated from information that is not provided to the party performing the training of the neural network, and wherein the one or more orthogonal transformations and the corresponding pad of values are each insufficient alone to recover the original example from the modified example, such that the original example is recoverable only given both the one or more orthogonal transformations and the corresponding pad of values, and wherein this mutual dependency is an intrinsic structural property of the transformation architecture itself, whereby the modified training examples may be used to train a neural network without providing the training party with sufficient information to reconstruct the original training examples, thereby improving the security of a neural network training system by enabling neural network training on proprietary or sensitive data without exposing the original data values to the party performing the training:

training the neural network by:

obtaining the plurality of training examples, modifying each training example of the plurality of training examples according to the corresponding transformation to form a plurality of modified training examples, and forming a trained neural network by training the neural network with the plurality of modified training examples; and forming predictions using the trained neural network by:

accepting a test example, modifying the test example according to the corresponding transformation to form a modified test example, and forming a prediction from the output of the trained neural network by providing the trained neural network with the modified test example as input, wherein training the neural network with the plurality of modified training examples produces a trained neural network that forms predictions on modified test examples without requiring the training party to access or reconstruct the original training examples or the pads of values at any point during training or prediction.

2. The method of claim 1, where each pad of values of the plurality of pads of values corresponding to a training example differs from each of the other pads of values corresponding to the other training examples.

3. The method of claim 1, where at least one nonorthogonal transformation of the one or more nonorthogonal transformations includes a plurality of perturbation functions, where each perturbation function of the plurality of perturbation functions corresponds to a position in the array of values as presented to the perturbation functions, where the modifying each training example includes applying the corresponding plurality of perturbation functions to the values at the corresponding positions in the training example as presented to the perturbation functions, and where the modifying the test example includes applying the corresponding plurality of perturbation functions to the values at the corresponding positions in the test example as presented to the perturbation functions.

4. The method of claim 3, where each perturbation function of the plurality of perturbation functions is the same.

5. The method of claim 3, where at least one perturbation function of the plurality of perturbation functions differs from each of the other perturbation functions of the plurality of perturbation functions, or where each perturbation function of the plurality of perturbation functions differs from each of the other perturbation functions of the plurality of perturbation functions.

6. The method of claim 1, where at least one orthogonal transformation of the one or more orthogonal transformations is an index shuffling or where at least one orthogonal transformation of the one or more orthogonal transformations is selected from a plurality of random orthogonal matrix transformations.

7. The method of claim 1, where training the neural network is performed by two or more parties.

8. The method of claim 1, where the forming predictions using the trained neural network is performed by two or more parties.

9. The method of claim 1, further including maintaining a ledger of the occurrence of modifying a test example or of the occurrence of providing the trained neural network with a modified test example to form a prediction.

10. The method of claim 1, further comprising:

prior to forming predictions using the trained neural network, encrypting the stored instructions for the plurality of transformations to form encrypted instructions, and where the forming predictions using the trained neural network further includes accepting the encrypted instructions and decrypting the encrypted instructions to form instructions executable to modify the examples.

11. A system for using modified data with a neural network, the system including networked memory and processors programmed to execute stored instructions to:

for each example of a plurality of examples, generate a corresponding transformation of a plurality of transformations, where each transformation of the plurality of transformations is a combination of one or more orthogonal transformations and one or more nonorthogonal transformations, where the one or more orthogonal transformations are the same for each transformation of the plurality of transformations, where each example is a training example of a plurality of training examples or a test example, where each example of the plurality of examples includes a stored array of values having n elements, where each transformation of the plurality of transformations includes a plurality of pads of values having p elements, where at least one pad of values corresponding to at least one training example differs from each of the other pads of values corresponding to the other training examples, where a modifying each example according to the corresponding transformation includes, by means of one or more processors executing stored instructions, an appending operation of appending the corresponding pad of values to the example and one or more orthogonal operations of applying the one or more orthogonal transformations to the example, to form a modified example having n+p elements, where each operation is applied to the values as presented to that operation, such that each example that is modified undergoes a transformation that increases the size of the example from n elements to n+p elements, and where the transformation includes at least one appending operation that precedes at least one of the one or more orthogonal operations such that the at least one orthogonal operation acts on an array of more than n elements, and such that at least one training example is modified with a different pad of values than the other training examples, where the corresponding pad of values for each example comprises a plurality of non-zero values, and is generated from information that is not provided to the party performing the training of the neural network, and wherein the one or more orthogonal transformations and the corresponding pad of values are each insufficient alone to recover the original example from the modified example, such that the original example is recoverable only given both the one or more orthogonal transformations and the corresponding pad of values, and wherein this mutual dependency is an intrinsic structural property of the transformation architecture itself, whereby the modified training examples may be used to train a neural network without providing the training party with sufficient information to reconstruct the original training examples, thereby improving the security of a neural network training system by enabling neural network training on proprietary or sensitive data without exposing the original data values to the party performing the training:

the one or more processors further programmed to train the neural network by:

obtaining the plurality of training examples, modifying each training example of the plurality of training examples according to the corresponding transformation to form a plurality of modified training examples, and forming a trained neural network by training the neural network with the plurality of modified training examples; and the one or more processors further programmed to form predictions using the trained neural network by:

accepting a test example, modifying the test example according to the corresponding transformation to form a modified test example, and forming a prediction from the output of the trained neural network by providing the trained neural network with the modified test example as input, wherein training the neural network with the plurality of modified training examples produces a trained neural network that forms predictions on modified test examples without requiring the training party to access or reconstruct the original training examples or the pads of values at any point during training or prediction.

12. The system of claim 11, where each pad of values of the plurality of pads of values corresponding to a training example differs from each of the other pads of values corresponding to other training examples.

13. The system of claim 11, where at least one nonorthogonal transformation of the one or more nonorthogonal transformations includes a plurality of perturbation functions, where each perturbation function of the plurality of perturbation functions corresponds to a position in the array of values as presented to the perturbation functions, where the modifying each training example includes applying the corresponding plurality of perturbation functions to the values at the corresponding positions in the training example as presented to the perturbation functions, and where the modifying the test example includes applying the corresponding plurality of perturbation functions to the values at the corresponding positions in the test example as presented to the perturbation functions.

14. The system of claim 13, where each perturbation function of the plurality of perturbation functions is the same.

15. The system of claim 13, where at least one perturbation function of the plurality of perturbation functions differs from each of the other perturbation functions of the plurality of perturbation functions, or where each perturbation function of the plurality of perturbation functions differs from each of the other perturbation functions of the plurality of perturbation functions.

16. The system of claim 11, where at least one orthogonal transformation of the one or more orthogonal transformations is an index shuffling or where at least one orthogonal transformation of the one or more orthogonal transformations is selected from a plurality of random orthogonal matrix transformations.

17. The system of claim 11, where training the neural network is performed by two or more parties.

18. The system of claim 11, where the forming predictions using the trained neural network is performed by two or more parties.

19. The system of claim 11, further including the processors programmed to store, in the memory, a ledger of the occurrence of modifying a test example or the occurrence of providing the trained neural network with a modified test example to form a prediction.

20. The system of claim 11, further comprising:

prior to forming predictions using the trained neural network, encrypting the stored instructions for the plurality of transformations to form encrypted instructions, and where the forming predictions using the trained neural network further includes accepting the encrypted instructions and decrypting the encrypted instructions to form instructions executable to modify the examples.

21. The method of claim 1, where each pad of values is randomly generated independently for each corresponding training example and test example.

22. The method of claim 1, where a statistical distribution of values in each pad of the plurality of pads is constrained to match the statistical distribution of values in the plurality of examples.

23. The system of claim 11, where each pad of values is randomly generated independently for each corresponding training example and test example.

24. The system of claim 11, where a statistical distribution of values in each pad of the plurality of pads is constrained to match the statistical distribution of values in the plurality of examples.

25. The method of claim 1, wherein the test example is one of a plurality of test examples, and where at least one test example of the plurality of test examples is modified with a different pad of values than the other test examples of the plurality of test examples.

26. The system of claim 11, wherein the test example is one of a plurality of test examples, and where at least one test example of the plurality of test examples is modified with a different pad of values than the other test examples of the plurality of test examples.

27. The method of claim 1, wherein the modifying each example includes two or more appending operations, each appending operation appending a corresponding pad of values having a number of elements independent of the number of elements in each other pad of values, such that the modified example has n+p elements where p is the total number of padding values contributed by all appending operations.

28. The system of claim 11, wherein the modifying each example includes two or more appending operations, each appending operation appending a corresponding pad of values having a number of elements independent of the number of elements in each other pad of values, such that the modified example has n+p elements where p is the total number of padding values contributed by all appending operations.

* * * * *